United States Patent
Yamamoto

(10) Patent No.: US 8,662,529 B2
(45) Date of Patent: Mar. 4, 2014

(54) SIDE AIRBAG DEVICE FOR VEHICLE

(75) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/318,432

(22) PCT Filed: Mar. 17, 2010

(86) PCT No.: PCT/JP2010/054578
§ 371 (c)(1),
(2), (4) Date: Nov. 1, 2011

(87) PCT Pub. No.: WO2010/131518
PCT Pub. Date: Nov. 18, 2010

(65) Prior Publication Data
US 2012/0056410 A1    Mar. 8, 2012

(30) Foreign Application Priority Data
May 11, 2009  (WO) .................. PCT/JP2009/058779

(51) Int. Cl.
*B60R 21/16* (2006.01)

(52) U.S. Cl.
USPC ........................................ 280/730.2

(58) Field of Classification Search
USPC ................................... 280/729, 730.1, 730.2
See application file for complete search history.

(56) References Cited

U.S. PATENT DOCUMENTS

| | | |
|---|---|---|
| 5,141,247 A | 8/1992 | Barth |
| 5,423,568 A | 6/1995 | Zushi et al. |
| 5,427,406 A | 6/1995 | Zushi et al. |
| 5,586,782 A | 12/1996 | Zimmerman, II et al. |
| 5,687,988 A | 11/1997 | Storey et al. |

(Continued)

FOREIGN PATENT DOCUMENTS

| | | |
|---|---|---|
| CN | 1511738 A | 7/2004 |
| CN | 1655968 A | 8/2005 |

(Continued)

OTHER PUBLICATIONS

Aug. 18, 2009 International Search Report issued in International Application No. PCT/JP2009/058779 (with translation).

(Continued)

*Primary Examiner* — Paul N Dickson
*Assistant Examiner* — Robert A Coker
(74) *Attorney, Agent, or Firm* — Oliff & Berridge, PLC

(57) ABSTRACT

A side airbag having a high pressure chamber and a low pressure chamber divided by a sewn portion, a diffuser that distributes gas for inflation to the high pressure chamber and the low pressure chamber, and a check valve that regulates flowing of gas from a high pressure chamber side to a low pressure chamber side. A partitioning wall, that divides a lower chamber (high pressure chamber) and an upper chamber (low pressure chamber) within a side airbag, is structured by a portion of a lower base cloth (high pressure chamber base cloth) that structures the lower chamber or a portion of an upper base cloth (low pressure chamber base cloth) that structures the upper chamber. A check valve, that permits flowing of gas, jetted-out from a gas jetting-out portion of an inflator, from the upper chamber to the lower chamber and that regulates flowing of gas in an opposite direction, is provided integrally with the partitioning wall.

12 Claims, 23 Drawing Sheets

(56) References Cited

U.S. PATENT DOCUMENTS

| | | | |
|---|---|---|---|
| 5,803,486 A | 9/1998 | Spencer et al. | |
| 5,906,391 A | 5/1999 | Weir et al. | |
| 6,062,594 A * | 5/2000 | Asano et al. | 280/730.2 |
| 6,364,348 B1 | 4/2002 | Jang et al. | |
| 6,402,190 B1 | 6/2002 | Heudorfer et al. | |
| 6,478,329 B1 | 11/2002 | Yokoyama | |
| 6,802,529 B2 | 10/2004 | Takedomi et al. | |
| 6,827,368 B2 | 12/2004 | Jang et al. | |
| 7,021,652 B2 | 4/2006 | Kumagai et al. | |
| 7,063,350 B2 | 6/2006 | Steimke et al. | |
| 7,168,733 B2 | 1/2007 | Kumagai et al. | |
| 7,347,444 B2 | 3/2008 | Wheelwright | |
| 7,364,194 B2 | 4/2008 | Mabuchi et al. | |
| 7,384,062 B2 | 6/2008 | Yokoyama et al. | |
| 7,503,582 B2 | 3/2009 | Sendelbach et al. | |
| 7,581,752 B2 | 9/2009 | Kai et al. | |
| 7,637,530 B2 | 12/2009 | Yamaji et al. | |
| 7,661,699 B2 | 2/2010 | Buhrlen et al. | |
| 7,819,424 B2 | 10/2010 | Toda et al. | |
| 7,900,957 B2 | 3/2011 | Honda | |
| 7,926,838 B2 | 4/2011 | Honda et al. | |
| 7,938,436 B2 | 5/2011 | Lunt et al. | |
| 7,963,556 B2 | 6/2011 | Loos et al. | |
| 8,226,114 B2 | 7/2012 | Shimono | |
| 2003/0168836 A1 | 9/2003 | Sato et al. | |
| 2004/0130127 A1* | 7/2004 | Kurimoto et al. | 280/729 |
| 2005/0161927 A1 | 7/2005 | Yokoyama et al. | |
| 2005/0189742 A1 | 9/2005 | Kumagai et al. | |
| 2006/0001244 A1 | 1/2006 | Taguchi et al. | |
| 2006/0071458 A1 | 4/2006 | Sendelbach et al. | |
| 2006/0175809 A1 | 8/2006 | Yamaji et al. | |
| 2007/0164546 A1 | 7/2007 | Kai et al. | |
| 2007/0170707 A1 | 7/2007 | Sato et al. | |
| 2007/0284859 A1 | 12/2007 | Kashiwagi | |
| 2008/0174093 A1 | 7/2008 | Inoue | |
| 2009/0020987 A1 | 1/2009 | Wipasuramonton et al. | |
| 2009/0026743 A1 | 1/2009 | Arez | |
| 2010/0181749 A1 | 7/2010 | Sugimoto | |
| 2011/0285119 A1 | 11/2011 | Yamamoto et al. | |
| 2012/0025499 A1 | 2/2012 | Shibayama et al. | |
| 2012/0056410 A1 | 3/2012 | Yamamoto | |
| 2013/0099470 A1 | 4/2013 | Wipasuramonton et al. | |

FOREIGN PATENT DOCUMENTS

| | | |
|---|---|---|
| CN | 1715106 A | 1/2006 |
| DE | 195 17 764 A1 | 11/1996 |
| JP | A-10-100827 | 4/1998 |
| JP | A-11-70849 | 3/1999 |
| JP | A-11-157407 | 6/1999 |
| JP | A-2000-177527 | 6/2000 |
| JP | A-2001-063502 | 3/2001 |
| JP | A-2003-501303 | 1/2003 |
| JP | A-2003-335208 | 11/2003 |
| JP | A-2003-335209 | 11/2003 |
| JP | A-2004-122881 | 4/2004 |
| JP | A-2004-210047 | 7/2004 |
| JP | A-2004-256017 | 9/2004 |
| JP | A-2004-262261 | 9/2004 |
| JP | A-2004-268682 | 9/2004 |
| JP | A-2004-338698 | 12/2004 |
| JP | A-2005-186891 | 7/2005 |
| JP | A-2005-225351 | 8/2005 |
| JP | A-2005-531451 | 10/2005 |
| JP | A-2006-008015 | 1/2006 |
| JP | A-2006-8016 | 1/2006 |
| JP | A-2006-262261 | 9/2006 |
| JP | A-2007-186133 | 7/2007 |
| JP | A-2007-308122 | 11/2007 |
| JP | A-2008-018925 | 1/2008 |
| JP | A-2008-247373 | 10/2008 |
| JP | A-2009-23640 | 2/2009 |
| JP | A-2009-023640 | 2/2009 |
| JP | A-2010-163142 | 7/2010 |
| JP | A-2010-184595 | 8/2010 |
| WO | WO 2010/131326 A1 | 11/2010 |
| WO | WO 2011/077510 A1 | 6/2011 |

OTHER PUBLICATIONS

Feb. 16, 2010 International Search Report issued in International Application No. PCT/JP2009/071254 (with translation).

U.S. Appl. No. 13/502,665 in the name of Yamamoto, filed Apr. 18, 2012.

U.S. Appl. No. 13/201,397 in the name of Yamamoto, filed Aug. 12, 2011.

International Search Report issued in Application No. PCT/JP2010/054578; Dated Apr. 27, 2010 (With Translation).

Apr. 15, 2013 Office Action issued in U.S. Appl. No. 13/201,397.

Apr. 3, 2013 Notice of Opinion of First Examination issued in Chinese Application No. 201080018406.2 (with partial translation).

Oct. 10, 2013 Office Action issued in U.S. Appl. No. 13/502,665.

Aug. 7, 2013 Notice of Allowance issued in U.S. Appl. No. 13/201,397.

Notice of Allowance issued in U.S. Appl. No. 13/502,665 dated Nov. 25, 2013.

* cited by examiner

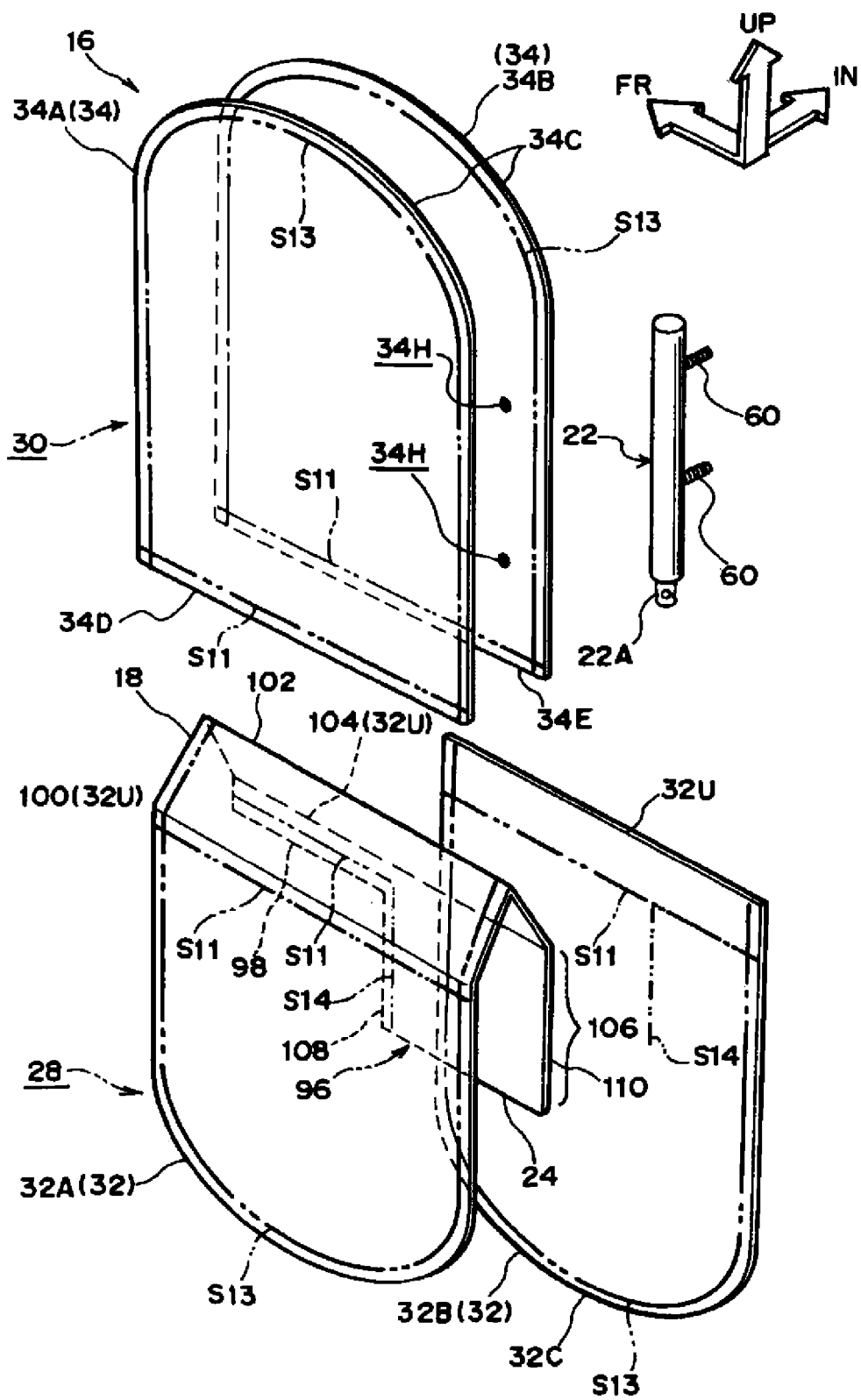

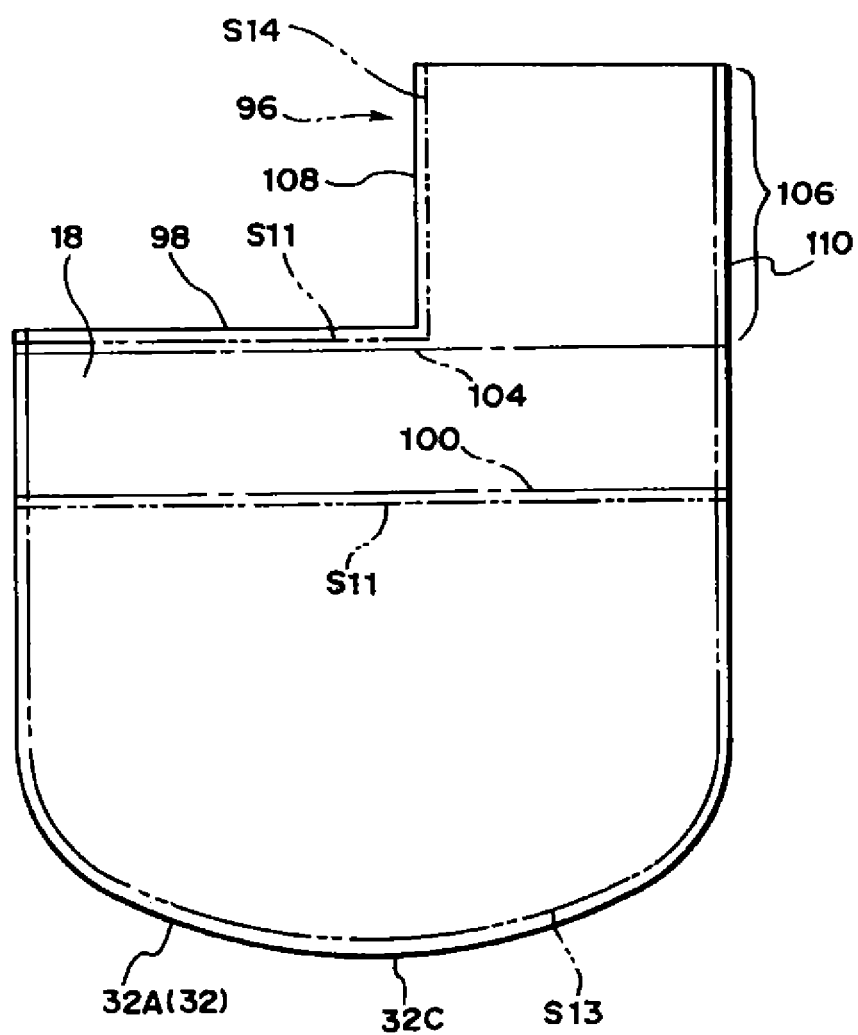

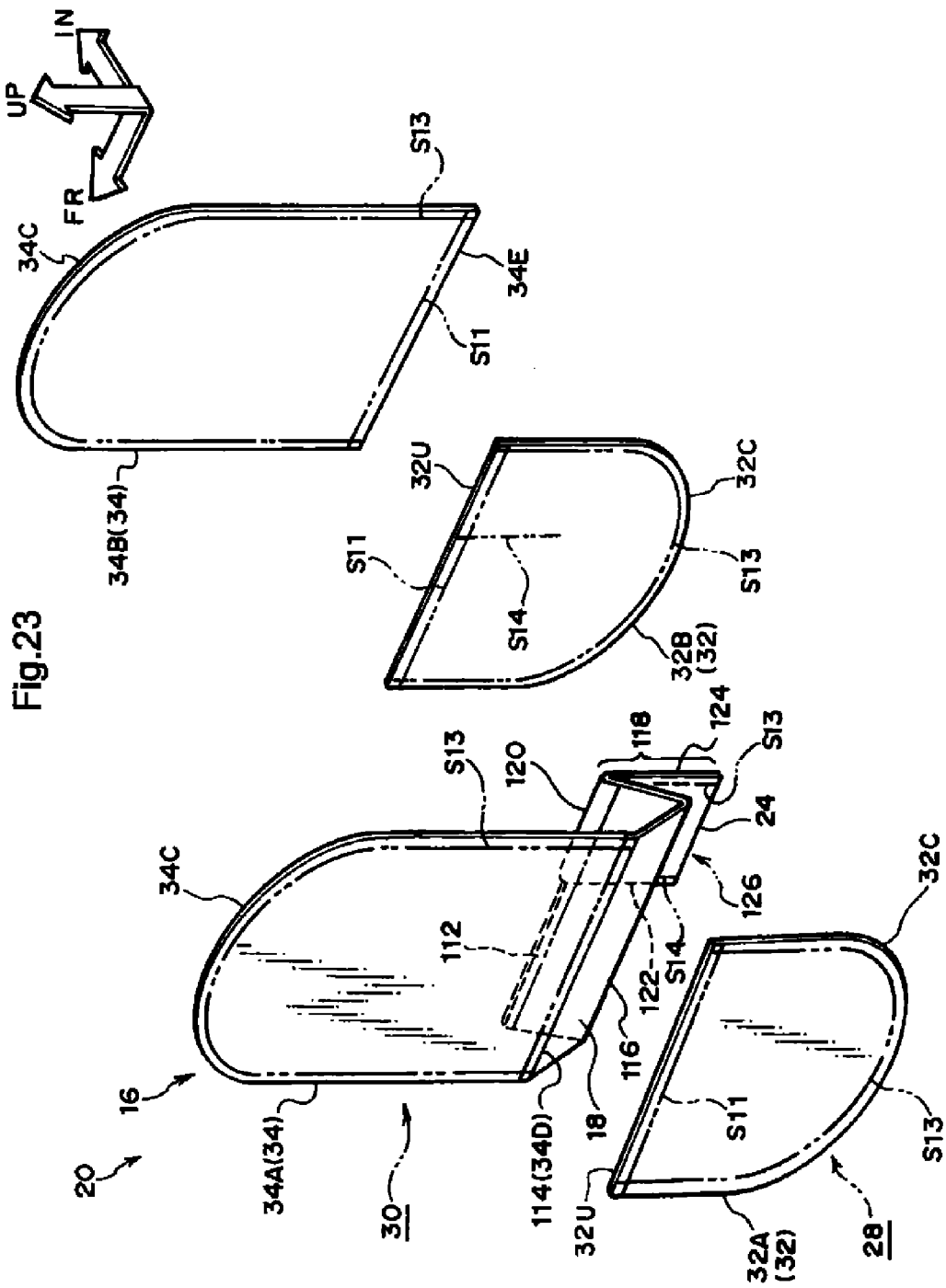

SIDE AIRBAG DEVICE FOR VEHICLE

TECHNICAL FIELD

The present invention relates to a side airbag device for a vehicle.

BACKGROUND ART

There is disclosed a two-chamber-type side airbag in which an airbag is divided by a partitioning wall into a first airbag portion positioned at the upper side and a second airbag portion positioned at the lower side, and the partitioning wall is structured by a portion of a cover of the second airbag portion, and the side airbag has, at the rear region of the airbag, a holder (diffuser) that is made of cloth and is for housing a gas generating device and spans between the first airbag portion and the second airbag portion (see Patent Document 1).

Further, there is disclosed a structure in which the interior of an airbag for a side collision is divided by a seam into an upper chamber and a lower chamber, and a communicating portion that communicates the upper chamber and the lower chamber is formed between the seam and the rear edge of the airbag, and a tube-shaped check valve is provided at the communicating portion, and a gas generator is disposed within the check valve, and, due to the flowing-out of gas from the lower chamber to the upper chamber being impeded by the check valve, the gas pressure within the lower chamber is maintained high as is even if the body of a passenger hits the lower chamber (see Patent Document 2).

PRIOR ART DOCUMENTS

Patent Documents

[Patent Document 1] Japanese Patent National Publication No. 2005-531451
[Patent Document 2] Japanese Patent Application Laid-Open No. 2004-256017

SUMMARY OF INVENTION

Technical Problem

However, in the conventional example recited in above-described Patent Document 1, in order to house the gas generating device, a holder of a cloth separate from the base cloth of the airbag is needed, and, at the time of inflation and deployment of the airbag, the flowing of gas from the second airbag portion to the first airbag portion cannot be regulated, and it is difficult to maintain the internal pressure of the second airbag portion in a high pressure state.

Also in the conventional example recited in above-described Patent Document 2, a sheet of a cloth separate from the base cloth of the airbag is needed in order to provide the check valve, and it can be thought that there is room for improvement in terms of cost reduction.

In view of the above-described circumstances, an object of the present invention is to reduce the cost and improve the productivity of a side airbag having a high pressure chamber and a low pressure chamber that are divided by a sewn portion, a diffuser that distributes gas for inflation to the high pressure chamber and the low pressure chamber, and a check valve that regulates flow of gas from the high pressure chamber side to the low pressure chamber side.

Solution to Problem

A first aspect of the present invention is a side airbag device for a vehicle, comprising: a side airbag having a high pressure chamber that becomes a high pressure side at a time of inflation and deployment, and a low pressure chamber that becomes a lower pressure than the high pressure chamber, the high pressure chamber and the low pressure chamber each inflating and deploying at a time of a side collision; a partitioning wall that is structured from a portion of a high pressure chamber base cloth that structures the high pressure chamber or from a portion of a low pressure chamber base cloth that structures the low pressure chamber, and that divides the high pressure chamber and the low pressure chamber; an inflator that, at a time of a side collision, jets-out gas for inflation from a gas jetting-out portion, and supplies gas to an interior of the side airbag; and a check valve that is provided integrally with the partitioning wall, that permits flowing of gas, jetted-out from the gas jetting outportion of the inflator, from the low pressure chamber to the high pressure chamber, and that regulates flowing of gas in an opposite direction.

In the side airbag device for a vehicle relating to the first aspect, the side airbag has the high pressure chamber that becomes a high pressure side at a time of inflation and deployment, and the low pressure chamber that becomes a lower pressure than the high pressure chamber, and the high pressure chamber and the low pressure chamber are divided by the partitioning wall.

Further, although the internal pressure of the high pressure chamber is maintained by the check valve that is provided integrally with the partitioning wall, the partitioning wall and the check valve are structured by a portion of the high pressure chamber base cloth or a portion of the low pressure chamber base cloth. Therefore, the cost needed to sew the side airbag is reduced and the productivity can be improved, as compared with a structure in which the partitioning wall and the check valve are separately provided.

At the time of a side collision, the inflator operates, and gas for inflation, jetted-out from the gas jetting-out portion of the inflator, is supplied to the high pressure chamber and the low pressure chamber. At this time, by the check valve, flowing-in of gas from the low pressure chamber side to the high pressure chamber side is permitted, and flowing-out of gas from the high pressure chamber side to the low pressure chamber side is regulated. Accordingly, when jetting-out of gas from the inflator ends, the internal pressure of the high pressure chamber can be maintained in a high pressure state over a longer time period.

In a second aspect of the present invention, in the side airbag device for a vehicle relating to the first aspect, the partitioning wall is formed by, of the high pressure chamber base cloth or the low pressure chamber base cloth, an end portion of an outer base cloth that is positioned at a seat transverse direction outer side of a vehicle seat, and an end portion of an inner base cloth that is positioned at a seat transverse direction inner side, being sewn together, and the check valve is formed by at least one of the outer base cloth or the inner base cloth extending toward a high pressure chamber side, at a seat rear side within the side airbag.

In the side airbag device for a vehicle relating to the second aspect, the partitioning wall is formed by sewing an end portion of the outer base cloth and an end portion of the inner base cloth, of the high pressure chamber base cloth or the low pressure chamber base cloth, and the check valve is formed by at least one of the outer base cloth or the inner base cloth extending toward the high pressure chamber side. Therefore, there is no need to add a partitioning wall and a check valve separately from the base cloths that structure the side airbag. Thus, sewing for increasing the air-tightness can be omitted, manufacturing of the side airbag also is easy, and a great cost reduction can be devised.

In a third aspect of the present invention, in the side airbag device for a vehicle relating to the first aspect, the partitioning wall is formed by, of the high pressure chamber base cloth, an end portion at a low pressure chamber side of a high pressure chamber outer base cloth, which is positioned at a seat transverse direction outer side of a vehicle seat, being sewn to, of the high pressure chamber base cloth, a high pressure chamber inner base cloth that is positioned at a seat transverse direction inner side, and the check valve is formed by an extending portion toward a low pressure chamber side being provided at an end portion at the low pressure chamber side of the high pressure chamber outer base cloth at a seat rear side within the side airbag, the extending portion being folded-over toward a high pressure chamber side, and an end edge at a seat front side and an end edge at a seat rear side of the extending portion respectively being sewn to; of the high pressure chamber base cloth, the high pressure chamber inner base cloth that is positioned at the seat transverse direction inner side.

In the side airbag device for a vehicle relating to the third aspect, the partitioning wall is formed by sewing the end portion at the low pressure chamber side of the high pressure chamber outer base cloth to the high pressure chamber inner base cloth. The check valve is formed by folding an extending portion, that is provided at the end portion at the low pressure chamber side of the high pressure chamber outer base cloth, over toward the high pressure chamber side, and respectively sewing the seat front side end edge and the seat rear side end edge at the extending portion to the low pressure chamber inner base cloth. Therefore, there is no need to add a partitioning wall and a check valve separately from the base cloths that structure the side airbag. Thus, sewing for increasing the air-tightness can be omitted, manufacturing of the side airbag also is easy, and a great cost reduction can be devised.

In a fourth aspect of the present invention, in the side airbag device for a vehicle relating to the first aspect, the partitioning wall is formed by, of the low pressure chamber base cloth, an end portion at a high pressure chamber side of a low pressure chamber outer base cloth, which is positioned at a seat transverse direction outer side of a vehicle seat, being sewn to, of the low pressure chamber base cloth, a low pressure chamber inner base cloth that is positioned at a seat transverse direction inner side, and the check valve is formed by an extending portion toward a high pressure chamber side being provided at an end portion at the high pressure chamber side of the low pressure chamber outer base cloth at a seat rear side within the side airbag, an end edge at a seat front side and an end edge at a seat rear side of the extending portion respectively being sewn to, of the high pressure chamber base cloth, a high pressure chamber inner base cloth that is positioned at the seat transverse direction inner side.

In the side airbag device for a vehicle relating to the fourth aspect, the partitioning wall is formed by sewing the end portion at the high pressure chamber side of the low pressure chamber outer base cloth to the low pressure chamber inner base cloth. The check valve is formed by providing an extending portion toward the high pressure chamber side at the end portion at the high pressure chamber side of the low pressure chamber outer base cloth, and respectively sewing the seat front side end edge and the seat rear side end edge at the extending portion to the high pressure chamber inner base cloth. Therefore, there is no need to add a partitioning wall and a check valve separately from the base cloths that structure the side airbag. Thus, sewing for increasing the air-tightness can be omitted, manufacturing of the side airbag also is easy, and a great cost reduction can be devised.

In a fifth aspect of the present invention, in the side airbag device for a vehicle relating to any one aspect of the first aspect through the fourth aspect, a diffuser that distributes gas, jetted-out from the gas jetting-out portion of the inflator, mainly to a high pressure chamber side, and that distributes the gas also to a low pressure chamber side, is provided integrally with the partitioning wall.

In the side airbag device for a vehicle relating to the fifth aspect, the flow of gas can be regulated by the diffuser such that the gas, jetted-out from the gas jetting-out portion of the inflator, is made to flow mainly to the high pressure chamber side and is distributed also to the low pressure chamber. By providing such the diffuser integrally with the partitioning wall, the high pressure chamber and the low pressure chamber can respectively be inflated and deployed stably, while devising a reduction in costs.

In a sixth aspect of the present invention, in the side airbag device for a vehicle relating to any one aspect of the first aspect through the fifth aspect, coating for increasing air-tightness is carried out on an inner surface of the high pressure chamber base cloth.

In the side airbag device for a vehicle relating to the sixth aspect, because coating for increasing air-tightness is carried out on the inner surface of the high pressure chamber base cloth, the internal pressure of the high pressure chamber can be maintained more stably at the time of inflation and deployment of the side airbag.

Advantageous Effects of Invention

As described above, in accordance with the side airbag device for a vehicle relating to the first aspect of the present invention, there are the excellent effects of reducing costs and improving productivity with respect to a side airbag having a high pressure chamber and a low pressure chamber divided by a sewn portion, a diffuser that distributes gas for inflation to the high pressure chamber and the low pressure chamber, and a check valve that regulates flowing of gas from a high pressure chamber side to a low pressure chamber side.

In accordance with the side airbag devices for a vehicle relating to the second through fourth aspects, there are the excellent effects that sewing for increasing the air-tightness can be omitted, manufacturing of the side airbag also is easy, and a great cost reduction can be devised.

In accordance with the side airbag device for a vehicle relating to the fifth aspect, there is the excellent effect that the high pressure chamber and the low pressure chamber can respectively be inflated and deployed stably, while devising a reduction in costs.

In accordance with the side airbag device for a vehicle relating to the sixth aspect, there is the excellent effect that the internal pressure of the high pressure chamber can be maintained more stably at the time of inflation and deployment of the side airbag.

BRIEF DESCRIPTION OF DRAWINGS

FIG. 1 is a side view showing a state in which a side airbag is inflated and deployed at the side of a passenger seated in a vehicle seat.

FIG. 2 is a side view showing a side airbag device for a vehicle.

FIG. 3 is an enlarged sectional view along arrow 3-3 in FIG. 2, showing a state in which, at the time of operation of an inflator, a check valve opens due to pressure of gas that is jetted-out from a first opening portion of a diffuser toward a lower chamber, and the gas is supplied to the lower chamber, and gas that is jetted-out from a second opening portion is supplied to an upper chamber.

FIG. 4 is an enlarged sectional view along arrow 4-4 in FIG. 2, showing a state in which jetting-out of gas from the inflator ends and the check valve closes.

FIG. 5 is an enlarged sectional view along arrow 5-5 in FIG. 2, showing a structure in which a side airbag interior is divided by a partitioning wall into the upper chamber and the lower chamber.

FIG. 6 is an enlarged sectional view along arrow 6-6 in FIG. 2, showing principles of the check valve closing, in a state in which illustration of the inflator, the diffuser, and the partitioning wall are omitted.

FIG. 7 is an enlarged sectional view along arrow 7-7 in FIG. 2, showing and example in which a reinforcing cloth is overlappingly sewn to the check valve, in a state in which illustration of the inflator, the diffuser, and the partitioning wall are omitted.

FIG. 8 through FIG. 23 relate to a second embodiment, and FIG. 8 is a side view showing a state in which a side airbag is inflated and deployed at the side of a passenger seated in a vehicle seat.

FIG. 9 is a side view showing the side airbag.

FIG. 10 is an enlarged sectional view along arrow F10-F10 in FIG. 9, showing a structure in which a side airbag interior is divided by a partitioning wall into an upper chamber and a lower chamber.

FIG. 11 is an enlarged sectional view along arrow F11-F11 in FIG. 9, showing a state in which, at the time of operation of an inflator, a check valve opens due to pressure of gas that is jetted-out from a first opening portion of a diffuser toward the lower chamber, and the gas is supplied to the lower chamber, and gas that is jetted-out from a second opening portion is supplied to the upper chamber.

FIG. 12 is an enlarged sectional view along arrow F12-F12 in FIG. 9, showing a state in which jetting-out of gas from the inflator ends and the check valve closes.

FIG. 13 is an exploded perspective view showing a side airbag device for a vehicle.

FIG. 14 is an enlarged sectional view showing a state in which an upper end portion of a lower base cloth is sewn respectively to an outer base cloth and an inner base cloth of an upper base cloth.

FIG. 15 is an enlarged sectional view showing a state in which the lower base cloth is turned-up upward, and a lower end of the upper base cloth is sewn.

FIG. 16 through FIG. 18 relate to modified example 1, and FIG. 16 is an exploded perspective view of the side airbag device for a vehicle.

FIG. 17 is a perspective view showing a development state of the upper base cloth.

FIG. 18 is a perspective view showing a state in which, at the upper base cloth, the outer base cloth and the inner base cloth, and a region that becomes a diffuser, are folded.

FIG. 19 and FIG. 20 relate to modified example 2, and FIG. 19 is an exploded perspective view of the side airbag device for a vehicle.

FIG. 20 is a perspective view showing a state in which, at the lower base cloth, the outer base cloth and the inner base cloth are folded.

FIG. 21 and FIG. 22 relate to modified example 3, and FIG. 21 is an exploded perspective view of the side airbag.

FIG. 22 is a development view of the lower base cloth.

FIG. 23 is an exploded perspective view of the side airbag relating to modified example 4.

DESCRIPTION OF EMBODIMENTS

Embodiments of the present invention are described hereafter on the basis of the drawings.

First Embodiment

Figure 1:
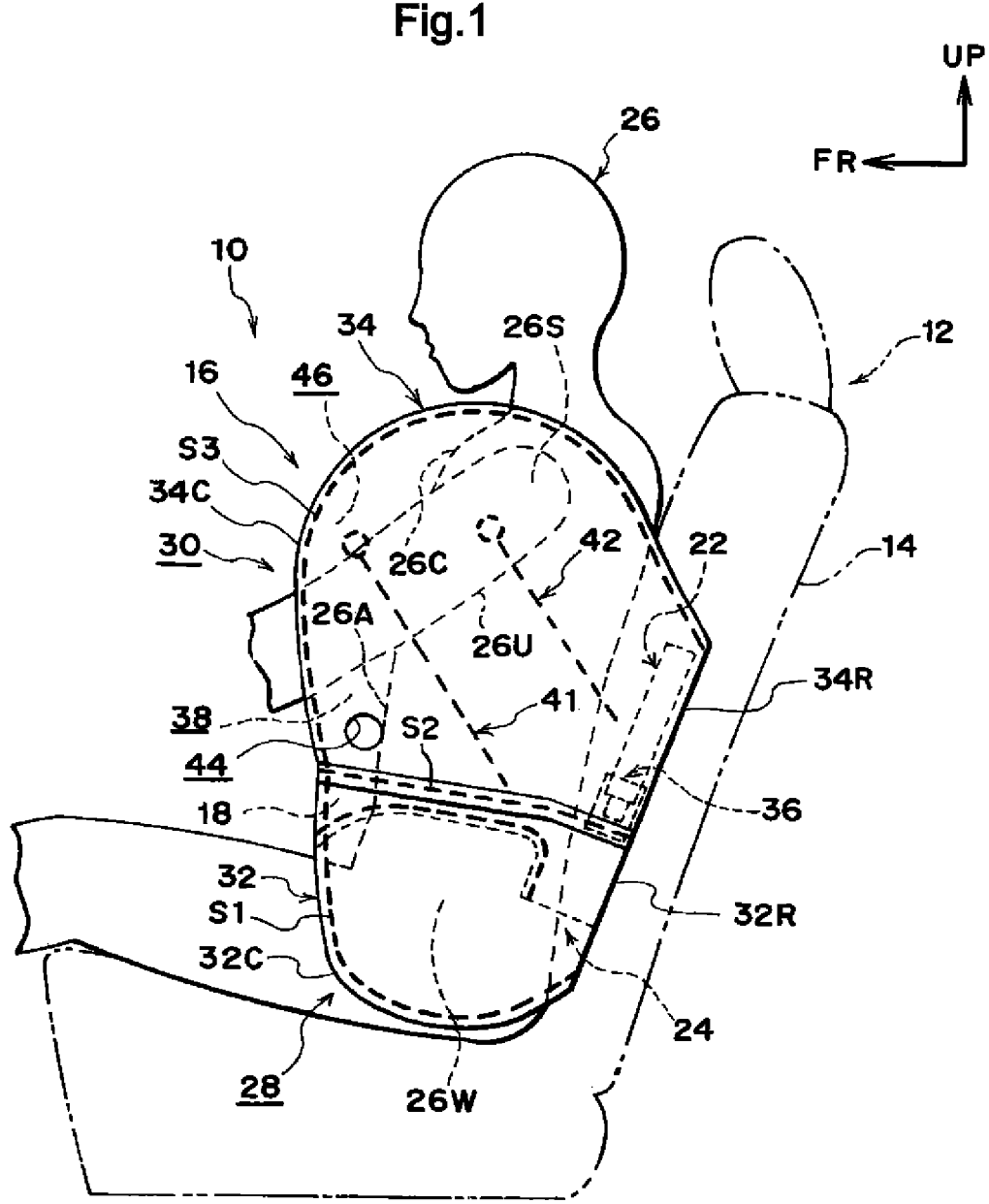
FIG. 1 through FIG. 7 relate to a first embodiment.
Figure 2:
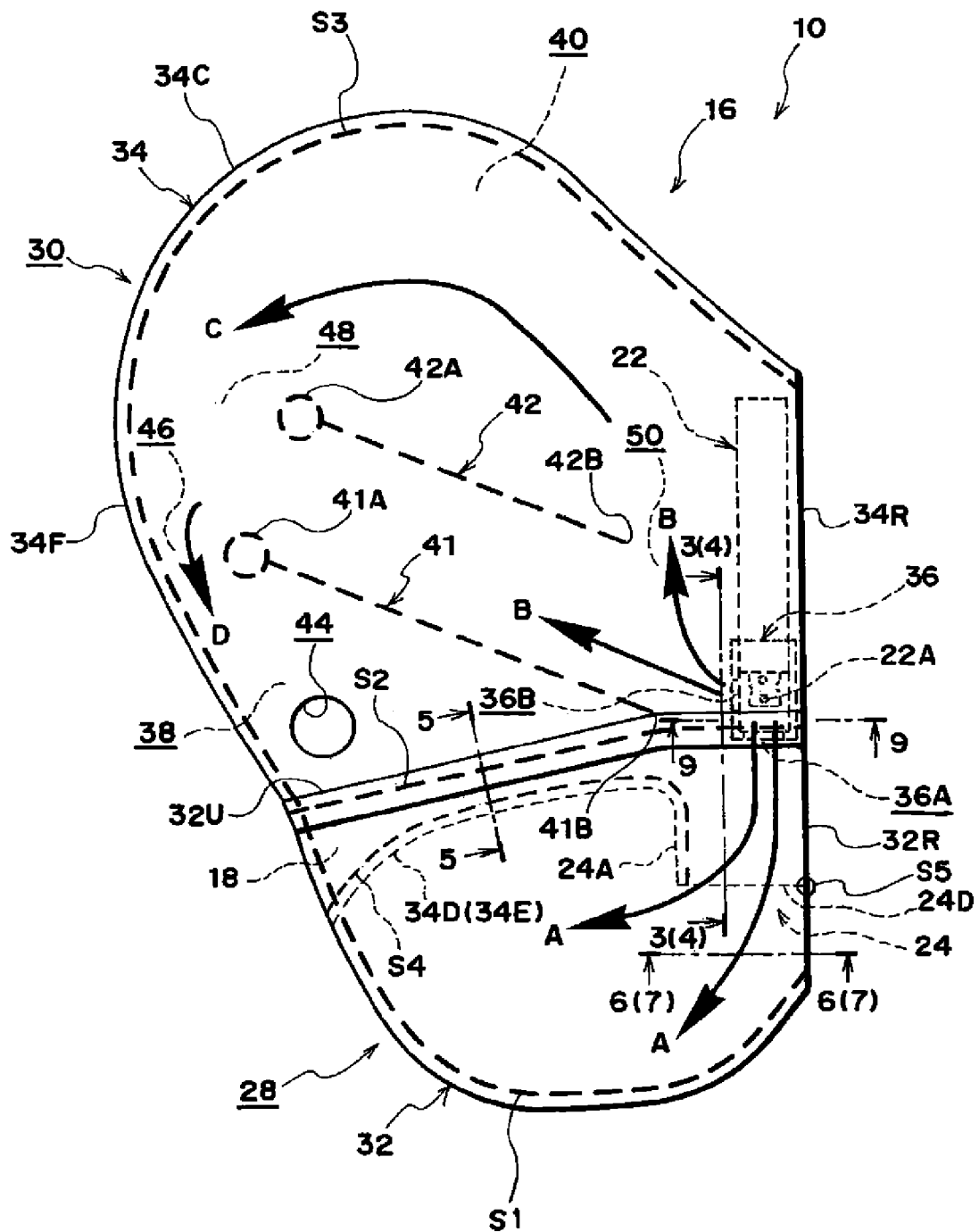
Figure 3:
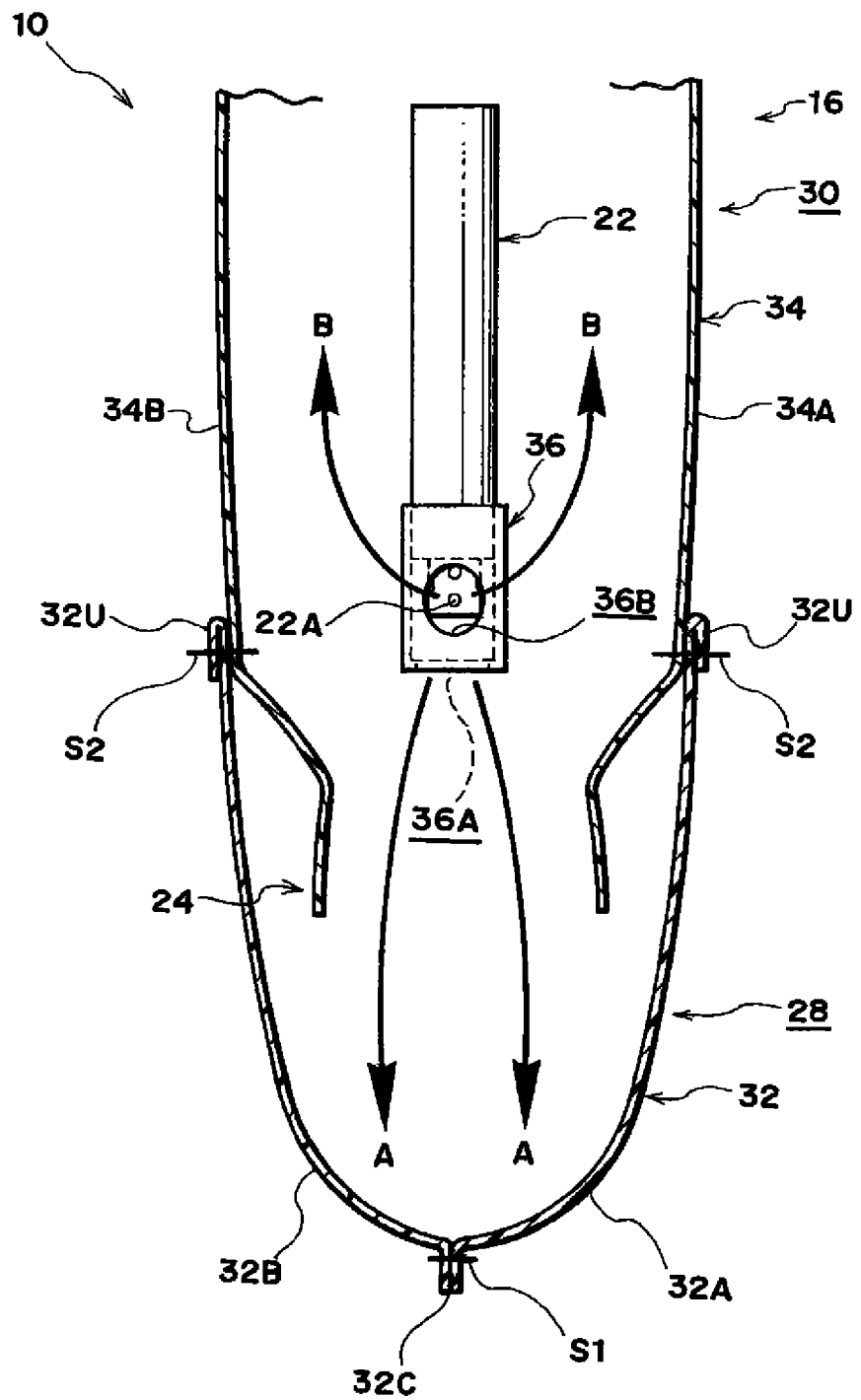

In FIG. 1 through FIG. 3, a side airbag device 10 for a vehicle relating to the present embodiment relates to, for example, a side airbag device that is installed in the side portion of a seat back 14 at a vehicle seat 12, and has a side airbag 16, a partitioning wall 18, an inflator 22, and a check valve 24.

The side airbag 16 is structured so as to, at the time of a side collision, receive a supply of gas from the inflator 22 and inflate and deploy at the side of a passenger 26 seated in the vehicle seat 12, and has a lower chamber 28 that is an example of a high pressure chamber that becomes the high pressure side at the time of the inflation and deployment, and an upper chamber 30 that is an example of a low pressure chamber that becomes a lower pressure than the high pressure chamber. The lower chamber 28 and the upper chamber 30 are structured so as to respectively inflate and deploy at the time of a side collision.

The lower chamber 28 is formed by a lower base cloth 32 that is an example of a high pressure chamber base cloth, and, at the side airbag 16 in the inflated and deployed state, is the inflated portion that is positioned at the seat lower side, and corresponds to a waist portion 26W of the passenger 26 seated in the vehicle seat 12. This lower chamber 28 is formed by, at the lower base cloth 32, an outer base cloth 32A that is positioned at the seat transverse direction outer side of the vehicle seat 12, and an inner base cloth 32B that is positioned at the seat transverse direction inner side, being folded in two toward the seat front side around a seat rear end portion 32R, and being sewn at a peripheral edge portion 32C (sewn portion S1). Note that, in order to improve the air-tightness of the lower chamber 28 that serves as the high pressure chamber, coating may be carried out on the inner surface of the lower base cloth 32.

An upper end portion 32U of the lower base cloth 32 is sewn to, of an upper base cloth 34 that is an example of a low pressure chamber base cloth that structures the upper chamber 30, a bag outer surface side at the upper end of a lower region that is used as the partitioning wall 18 (sewn portion S2). Here, as shown from FIG. 3 to FIG. 5, the upper end portion 32U of the lower base cloth 32 is, in a state of being folded-over such that the thickness is increased, sewn to the upper base cloth 34. This is for reinforcing the sewn portion S2. Note that the reinforcing means is not limited to the folding-over of the upper end portion 32U, and, for example, a separate member for reinforcement may be sewn overlappingly.

In FIG. 1, the upper chamber 30 is structured from the upper base cloth 34, and, at the side airbag 16 in the inflated and deployed state, is the inflated portion that is positioned at the seat upper side, and corresponds to at least one of a chest portion 26C or a shoulder portion 26S of the passenger 26 seated in the vehicle seat 12. In the present embodiment, the upper chamber 30 corresponds to both the chest portion 26C and the shoulder portion 26S of the passenger 26, and also corresponds to an upper arm portion 26U and an abdomen portion 26A. As shown from FIG. 1 to FIG. 3, this upper chamber 30 is formed by, at the upper base cloth 34, an outer base cloth 34A that is positioned at the seat transverse direction outer side of the vehicle seat 12, and an inner base cloth 34B that is positioned at the seat transverse direction inner side, being folded in two toward the seat front side around a seat rear end portion 34R, and being sewn at a peripheral edge portion 34C (sewn portion S3).

Figure 5:
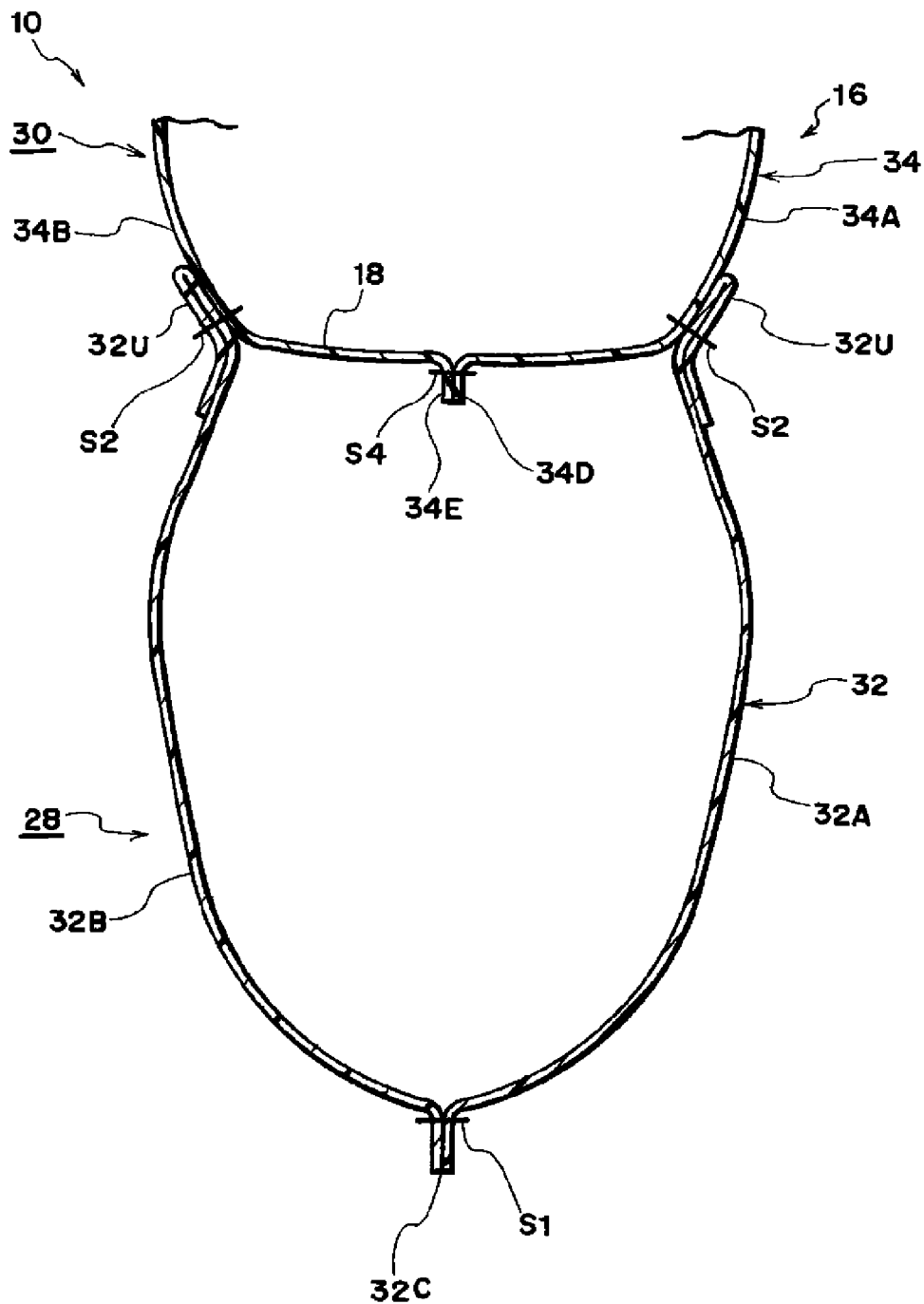

In FIG. 5, the partitioning wall 18 is structured by a portion of the lower base cloth 32 or a portion of the upper base cloth 34, and is a region that divides the lower chamber 28 that is the high pressure chamber and the upper chamber 30 that is the low pressure chamber, and is formed by, for example, of the upper base cloth 34, a lower end 34D (end portion) of the outer base cloth 34A that is positioned at the seat transverse direction outer side of the vehicle seat 12, and a lower end 34E (end portion) of the inner base cloth 34B that is positioned at the seat transverse direction inner side, being sewn (sewn portion S4). As shown in FIG. 1, at the side airbag 16 in the inflated and deployed state, this partitioning wall 18 is provided at a position that corresponds to the abdomen portion 26A of the passenger 26 seated in the vehicle seat 12.

In FIG. 2, FIG. 3, the inflator 22 is a gas generating source that, at the time of a side collision, jets-out gas for inflation from a gas jetting-out portion 22A and supplies the gas to the interior of the side airbag 16. This inflator 22 is positioned, at the interior of the side airbag 16 in the inflated and deployed state, at the seat rear side of the vehicle seat 12, and concretely, in a vicinity of the seat rear end portion, and is disposed within the upper chamber 30 that is the low pressure chamber in a state in which the gas jetting-out portion 22A faces the lower chamber 28 side that is the high pressure chamber.

Although not illustrated, the inflator 22 is connected to an airbag ECU via a wire harness, and is structured so as to operate by operating current from the airbag ECU and supply the gas for inflation to the side airbag 16. The airbag ECU is structured so as to cause operating current to flow to the inflator 22 when the airbag ECU judges a side collision from a signal from a collision sensor (not shown).

A diffuser 36 is disposed at the gas jetting-out portion 22A of the inflator 22. This diffuser 36 is formed in a tube shape for example, and a first opening portion 36A that opens toward the lower chamber 28, and a second opening portion 36B that opens toward the upper chamber 30, e.g., the seat front side, are provided thereat, and the diffuser 36 is structured so as to regulate the flow of gas that is jetted-out from the gas jetting-out portion 22A of the inflator 22. Concretely, the diffuser 36 is structured so as to make the gas flow mainly to the lower chamber 28 through the first opening portion 36A, and distribute the gas as well to the upper chamber 30 through the second opening portion 36B. In order for the gas to be distributed also to the upper chamber 30 while being made to flow mainly to the lower chamber 28, the opening surface area of the first opening portion 36A at the diffuser 36 is set to be greater than the opening surface area of the second opening portion 36B.

In FIG. 1, FIG. 2, a first seam 41, that is an example of a first bag thickness regulating portion and that extends rectilinearly for example from the diffuser 36 side obliquely upward and toward the front of the seat, is provided at the upper chamber 30 of the side airbag 16. The first seam 41 sews the outer base cloth 34A and the inner base cloth 34B that is positioned at the seat transverse direction inner side at the upper base cloth 34 that structures the upper chamber 30, and divides the upper chamber 30 into an intermediate chamber 38 at the seat lower side and an uppermost chamber 40 at the seat upper side. A vent hole 44 is formed in the region, that structures the intermediate chamber 38, of the upper base cloth 34. The internal pressure of the intermediate chamber 38 at the time of inflation and deployment of the side airbag 16 is set to be a lower pressure than the uppermost chamber 40.

A predetermined throttled gap 46 is provided between a seat front side distal end portion 41A of the first seam 41 and a seat front side peripheral edge portion 34F of the upper base cloth 34 at the upper chamber 30. Due thereto, as shown in FIG. 2, the gas flow is set such that, when the inflator 22 operates, the gas that is jetted-out from the second opening portion 36B of the diffuser 36 is supplied in the arrow B directions and the arrow C direction to the uppermost chamber 40, and passes through the throttled gap 46 and is supplied in the arrow D direction to the intermediate chamber 38.

A seat rear side distal end portion 41B of the first seam 41 is set at a position that is, for example, adjacent to the partitioning wall 18. This is for suppressing a greater than necessary increase in the internal pressure of the intermediate chamber 38 due to the gas that is jetted-out from the second opening portion 36B of the diffuser 36 flowing into the intermediate chamber 38 from the gap between the seat rear side distal end portion 41B of the first seam 41 and the partitioning wall 18 at the time of inflation and deployment of the side airbag 16.

Further, in FIG. 1, FIG. 2, a second seam 42, that is an example of a second bag thickness regulating portion and that extends rectilinearly for example from the diffuser 36 side obliquely upward and toward the front of the seat and sews the outer base cloth 34A and the inner base cloth 34B, is provided at the seat upper side of the first seam 41 at the upper chamber 30 at a predetermined interval from the first seam 41. This second seam 42 is provided at the uppermost chamber 40 at the upper chamber 30, and, in the same way as the first seam 41, sews the outer base cloth 34A and the inner base cloth 34B.

As shown in FIG. 1, a seat front side distal end portion 42A of the second seam 42 is set at a position corresponding to, for example, the upper arm portion 26U or the shoulder portion 26S of the passenger 26, and a gap 48 between the seat front side distal end portion 42A and the seat front side peripheral edge portion 34F of the upper base cloth 34 is set to be larger than the predetermined throttled gap 46 between the seat front side distal end portion 41A of the first seam 41 and the seat front side peripheral edge portion 34F. Further, a gap 50 between a seat rear side distal end portion 42B of the second seam 42 and the inflator 22 also is set to be larger than the predetermined throttled gap 46. This is so that an internal pressure difference does not arise between the upper side and the lower side of the second seam 42 at the uppermost chamber 40 at the time of inflation and deployment of the side airbag 16. Conversely, in a case in which an internal pressure difference is provided between the upper side and the lower side of the second seam 42 at the uppermost chamber 40 or the flow of gas at the interior of the uppermost chamber 40 is regulated, it suffices to appropriately change the position of the seat front side distal end portion 42A or the seat rear side distal end portion 42B and adjust the gaps 48, 50.

Note that, in FIG. 1, FIG. 2, the seat front side distal end portion 41A of the first seam 41 and the seat front side distal end portion 42A of the second seam 42 are both circular, but the shapes of the respective distal end portions are not limited to this. Further, the shapes of the first seam 41 and the second seam 42 are not limited to rectilinear, and may be curved shapes or bent shapes or the like. Moreover, the first seam 41 that is a sewn portion is given as an example of the first bag thickness regulating portion, and the second seam 42 that similarly is a sewn portion is given as an example of the second bag thickness regulating portion, but the first bag thickness regulating portion and the second bag thickness regulating portion are not limited to sewn portions. For example, the outer base cloth 34A and the inner base cloth 34B at the upper base cloth 34 may be regions that are joined by, for example, adhesion or welding.

Figure 4:
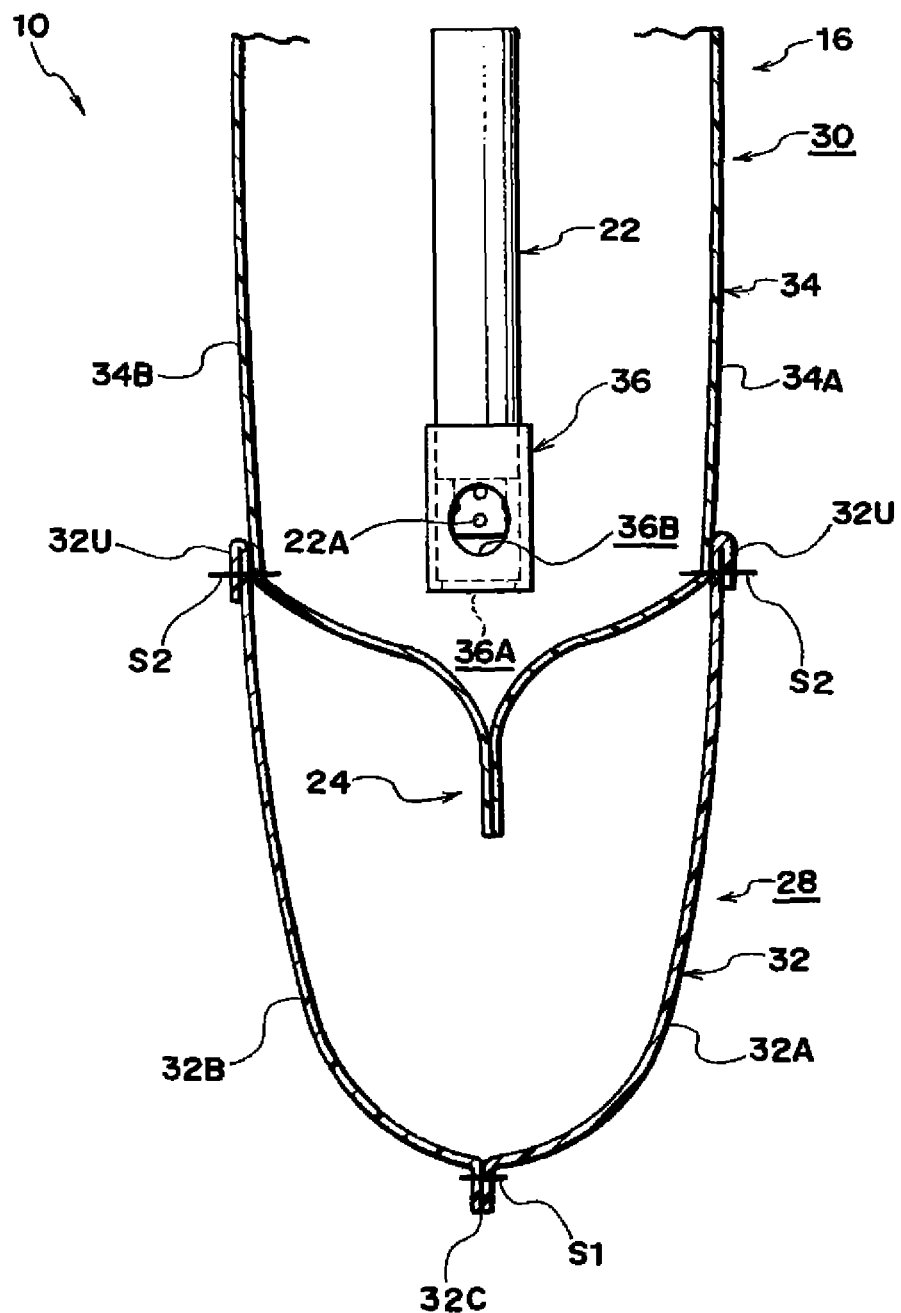
Figure 6:
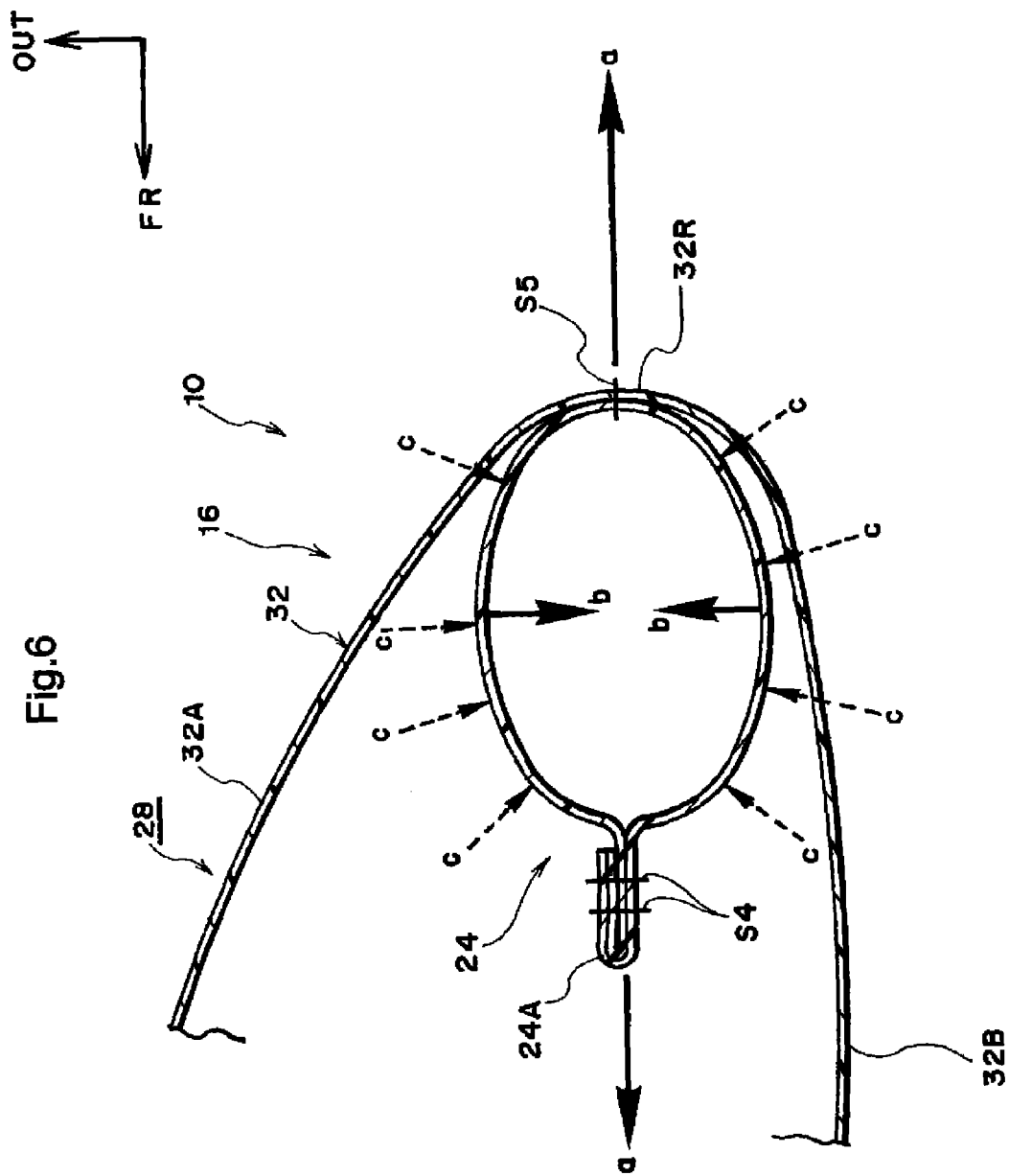

From FIG. 1 to FIG. 4, the check valve 24 is provided at the partitioning wall 18, and is a region that permits the gas, jetted-out from the gas jetting-out portion 22A of the inflator 22, to flow from the upper chamber 30 that is the low pressure chamber to the lower chamber 28 that is the high pressure chamber, and that regulates flowing of the gas in the opposite direction (FIG. 4). This check valve 24 is positioned at the seat rear side within the side airbag 16, and concretely, at the seat rear end portion of the partitioning wall 18, and is formed in the shape of a tube due to the upper base cloth 34 extending toward the seat lower side. As shown in FIG. 2, the lower ends 34D, 34E of the outer base cloth 34A and the inner base cloth 34B are continuous with a front edge 24A of the check valve 24. As shown in FIG. 6, this front edge 24A is sewn in a four-layer state due to the outer base cloth 34A and the inner base cloth 34B being overlapped and folded-back. Due thereto, the check valve 24 is formed in the shape of a tube.

As shown in FIG. 3, the check valve 24 is provided integrally with the partitioning wall 18, and is a region that permits the gas, jetted-out from the gas jetting-out portion 22A of the inflator 22, to flow from the upper chamber 30 to the lower chamber 28, and that regulates flowing of the gas in the opposite direction. This check valve 24 is formed by both the outer base cloth 34A and the inner base cloth 34B extending toward the lower chamber 28 side, at the seat rear side within the side airbag 16. Further, when the gas, jetted-out from the gas jetting-out portion 22A of the inflator 22 at the time of operation of the inflator 22, is jetted-out from the first opening portion 36A of the diffuser 36 toward the lower chamber 28, the check valve 24 opens due to the pressure thereof. Concretely, the outer base cloth 34A and the inner base cloth 34B of the upper base cloth 34 that structure the check valve 24 open in the shape of a tube.

Further, as shown in FIG. 4, the check valve 24 is structured so as to, when the jetting-out of gas from the inflator 22 ends and gas attempts to flow backward from the lower chamber 28 that is the high pressure chamber to the upper chamber 30 that is the low pressure chamber, close due to the outer base cloth 34A and the inner base cloth 34B of the upper base cloth 34 that structure the check valve 24 fitting tightly together.

As shown in FIG. 2, a lower end portion 24D of the check valve 24 is at least partially sewn (sewn portion S5) to the lower base cloth that structures the lower chamber 28. At the sewn portion S5, for example, the rear end corner portion of the lower end portion 24D of the check valve 24 is sewn to the seat rear end portion 32R of the lower base cloth 32.

Figure 7:
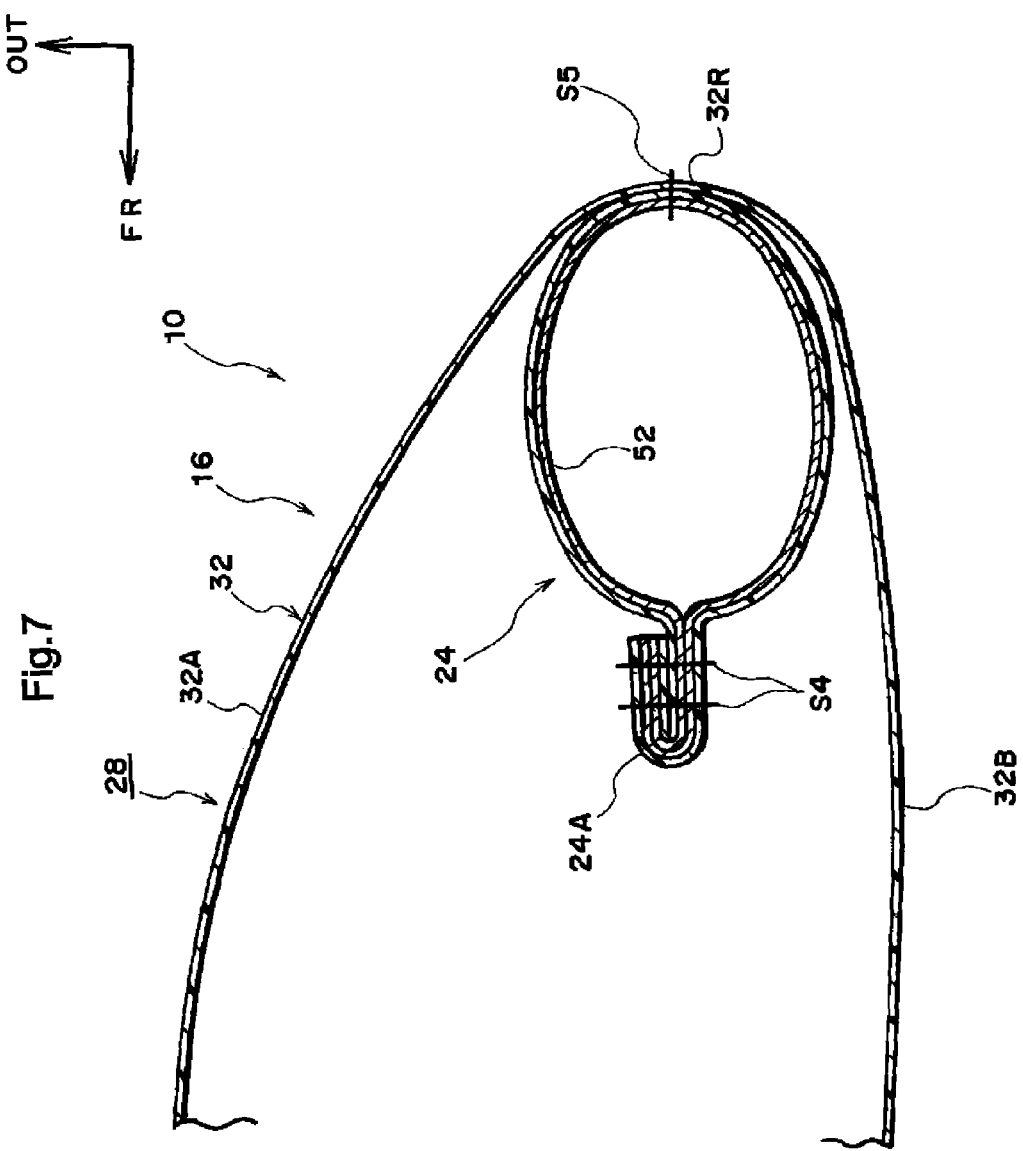

Note that, as shown in FIG. 7, a reinforcing cloth 52 may be overlappingly sewn to the check valve 24. This is so that the strength of the check valve 24 with respect to the high temperature/high pressure gas that is jetted-out from the gas jetting-out portion 22A of the inflator 22 can be increased more. In this example, the reinforcing cloth 52 is sewn overlappingly at the inner peripheral side of the check valve 24, and the front edge 24A of the check valve 24 is sewn in a six-layer state due to the outer base cloth 34A, the inner base cloth 34B and the reinforcing cloth 52 being overlapped and folded-back. This reinforcing cloth 52 may be overlapped on the outer periphery of the check valve 24.

Further, in the above-described structure, the lower chamber 28 at the side airbag 16 is formed by sewing the peripheral edge portion 32C of the lower base cloth 32, and the upper chamber 30 is formed by sewing the peripheral edge portion 34C of the upper base cloth 34. However, they are not limited to this, and for example, may respectively be formed by hollow weaving.

FIG. 6 is an enlarged sectional view along arrow 6-6 in FIG. 2, and, although the check valve 24 portion intrinsically does not become a cross-section, it is shown by hatching in order to clearly illustrate the overlapping of the layers. The same holds for the check valve 24 and the reinforcing cloth 52 in FIG. 7.

(Operation)

The present embodiment is structured as described above, and the operation thereof is described hereafter. In FIG. 1, a reclining mechanism (not illustrated) for adjusting the angle of tilting of the seat back 14 is generally provided at the vehicle seat 12, and it is difficult to ensure installation space for an airbag module at the lower portion of the side portion of the seat back 14. However, in the present embodiment, the inflator 22 is positioned at the seat rear side within the side airbag 16 and is disposed within the upper chamber 30 that is the low pressure chamber, and the folded-up dimensions (packaged dimensions) of the side airbag 16 can be made to be small. Therefore, the ability to install the airbag module (not shown) into the side portion of the seat back 14 is good.

Further, as shown in FIG. 5, at the side airbag 16, the lower chamber 28 that is the high pressure chamber and the lower chamber 28 that is the low pressure chamber are divided by the partitioning wall 18. This partitioning wall 18 is formed by sewing, among the upper base cloth 34 that structures the upper chamber 30, the lower end 34D of the outer base cloth 34A that is positioned at the seat transverse direction outer side of the vehicle seat 12, and the lower end 34E of the inner base cloth 34B that is positioned at the seat transverse direction inner side. Further, as shown in FIG. 2, the check valve 24 is provided at the partitioning wall 18. This check valve 24 is positioned at the seat rear side within the side airbag 16, and is formed by the outer base cloth 34A and the inner base cloth 34B of the upper base cloth 34 respectively extending toward the seat lower side. Accordingly, there is no need to add the partitioning wall 18 and the check valve 24 separately from the base cloths that structure the side airbag 16. Thus, sewing for increasing the air tightness can be omitted, manufacturing of the side airbag 16 also is easy, and a large decrease in costs can be devised.

Operation of the side airbag device 10 for a vehicle at the time of a side collision is described next. In FIG. 1, FIG. 2, at the side airbag device 10 for a vehicle relating to the present embodiment, when the airbag ECU judges the occurrence of the side collision on the basis of a signal from an unillustrated collision sensor, operating current is made to flow from the airbag ECU to the inflator 22. The inflator 22 receives the operating current and operates, and jets a large amount of gas out from the gas jetting-out portion 22A. Due to this gas being supplied into the side airbag 16, the side airbag 16 inflates from the seat back 14, and inflates and deploys between the vehicle side portion (not illustrated) and the passenger 26.

Here, as shown in FIG. 2, in the present embodiment, the inflator 22 is disposed within the upper chamber 30 that is the low pressure chamber, in a state in which the gas jetting-out portion 22A faces the lower chamber 28 that is the high pressure chamber. Further, the diffuser 36 is disposed at the gas jetting-out portion 22A of the inflator 22, and the first opening portion 36A that opens toward the lower chamber 28, and the second opening portion 36B that opens toward the upper chamber 30, are provided at the diffuser 36. Due to this diffuser 36, the flow of gas can be regulated such that the gas that is jetted-out from the gas jetting-out portion 22A mainly flows through the first opening portion 36A to the lower chamber 28 side and is distributed also to the upper chamber 30 through the second opening portion 36B.

As shown in FIG. 3, the check valve 24 opens in the shape of a tube due to the pressure of the gas that is supplied through the first opening portion 36A of the diffuser 36 from the inflator 22 within the upper chamber 30 toward the lower chamber 28, and permits the flow of gas in the arrow A directions from the upper chamber 30 to the lower chamber 28. On the other hand, gas is supplied also to the upper chamber 30 in the arrow B directions through the second opening portion 36B of the diffuser 36. Because the opening surface area of the first opening portion 36A at the diffuser 36 is set to be greater than the opening surface area of the second opening portion 36B, the gas for inflation is more preferentially supplied to the lower chamber 28 than the upper chamber 30. Accordingly, the lower chamber 28 inflates and deploys at an earlier stage than the upper chamber 30, and becomes a state of higher pressure than the upper chamber 30. Further, the lower chamber 28 and the upper chamber 30 can respectively be inflated and deployed stably by the simple structure of adding the diffuser 36.

When jetting-out of gas from the inflator 22 ends, gas attempts to flow backward from the lower chamber 28 that is the high pressure chamber to the upper chamber 30 that is the low pressure chamber, but, because the flow of this gas is regulated due to the check valve 24 closing as shown in FIG. 4, the internal pressure of the lower chamber 28 can be maintained over a longer time period. In particular, in the present embodiment, because the lower end portion 24D of the check valve 24 is at least partially sewn (sewn portion S5) to the lower base cloth 32 that structures the lower chamber 28, when the jetting-out of gas from the inflator 22 ends and the gas attempts to flow backward from the lower chamber 28 that is the high pressure chamber to the upper chamber 30 that is the low pressure chamber and the check valve 24 closes, inverting of the check valve 24 toward the upper chamber 30 side can be suppressed. Therefore, the internal pressure of the lower chamber 28 that is the high pressure chamber can be maintained more stably.

To supplementarily describe the operation at the time when the check valve 24 closes, as shown in FIG. 6, at the initial stage of jetting-out of gas from the inflator 22, because the pressure within the check valve 24 becomes extremely high, the check valve 24 attempts to open in a cylindrical shape. However, because the lower end portion 24D of the check valve 24 is sewn to the seat rear end portion 32R of the lower base cloth 32, as the internal pressure of the lower chamber 28 increases and the lower chamber 28 inflates and deploys toward the front of the seat, load in the arrow a directions, and load in the arrow b directions are applied to the check valve 24. Further, when the jetting-out of gas from the inflator 22 ends, the pressure within the check valve 24 becomes lower than the internal pressure of the lower chamber 28, and therefore, distributed load in the arrow c directions is applied to the check valve 24. Due to the synergism of these loads, the check valve 24 becomes easy to close.

The inflation and deployment of the upper chamber 30 is described next. As shown in FIG. 2, the upper chamber 30 is divided by the first seam 41 into the intermediate chamber 38 at the seat lower side and the uppermost chamber 40 at the seat upper side, and the gas for inflation that is supplied from the second opening portion 36B of the diffuser 36 is first supplied in the arrow B directions to within the uppermost chamber 40, and further flows in the arrow C direction. Due thereto, the uppermost chamber 40 proceeds to inflate and deploy. The bag thickness of the upper chamber 30 is regulated by the first seam 41. Further, the second seam 42 is provided at the uppermost chamber 40 at the upper chamber 30, and the bag thickness of the uppermost chamber 40 is regulated by the second seam 42. Accordingly, the uppermost chamber 40 can be inflated and deployed at an early stage and smoothly in the limited space between the upper body of the passenger 26, and in particular, the shoulder portion 26S and the upper arm portion 26U that jut-out the most toward the seat outer side, and the vehicle side portion. Further, the force of restraining the shoulder portion 26S, the chest portion 26C and the upper arm portion 26U, that are the regions corresponding to the uppermost chamber 40, can be optimized.

The gas that is supplied into the uppermost chamber 40 passes through the throttled gap 46 between the seat front side distal end portion 41A of the first seam 41 and the seat front side peripheral edge portion 34F of the upper base cloth 34, and is supplied in the arrow D direction into the intermediate chamber 38. Due thereto, the inflation and deployment timing of the intermediate chamber 38 becomes later than the uppermost chamber 40. Further, the vent hole 44 is formed at the region, that structures the intermediate chamber 38, of the upper base cloth 34, and gas is discharged from the vent hole 44 at the time when a portion of the upper body of the passenger 26, e.g., the abdomen portion 26A, is restrained by the intermediate chamber 38, in addition to at the time of inflation and deployment of the intermediate chamber 38. Due thereto, the internal pressure of the intermediate chamber 38, that is set to be a lower pressure than the uppermost chamber 40, decreases further.

In FIG. 1, in the present embodiment, at the time of inflation and deployment of the side airbag 16, the lower chamber 28 that is the high pressure chamber corresponds to the waist portion 26W of the passenger 26, and the upper chamber 30 that is the low pressure chamber corresponds to the chest portion 26C, the shoulder portion 26S, the upper arm portion 26U and the abdomen portion 26A of the passenger 26. Further, as described above, the lower chamber 28 inflates and deploys before the upper chamber 30, and the lower chamber 28 is higher pressure than the upper chamber 30. Accordingly, the waist portion 26W of the passenger 26 seated in the vehicle seat 12 can be restrained at an early stage and in a high pressure state by the lower chamber 28. Further, because the internal pressure of the lower chamber 28 can be maintained for a longer time period by the check valve 24, the passenger restraining performance at the time of a side collision can be improved more.

Further, the chest portion 26C, the shoulder portion 26S, the upper arm portion 26U and the abdomen portion 26A of the passenger 26 can be restrained by the upper chamber 30 of the side airbag 16. Concretely, mainly the chest portion 26C and the shoulder portion 26S of the passenger 26 are restrained by the uppermost chamber 40 at the upper chamber 30, and mainly the abdomen portion 26A can be restrained by the intermediate chamber 38. Further, by making the intermediate chamber 38 be lower pressure than the uppermost chamber 40, the force of restraining the abdomen portion 26A by the intermediate chamber 38 can be made to be weaker than the force of restraining the shoulder portion 26S and the chest portion 26C by the uppermost chamber 40.

In this way, in the side airbag device 10 for a vehicle relating to the present embodiment, the respective portions of the upper body of the passenger 26 can respectively be restrained by appropriate restraining forces by the upper chamber 30 of the side airbag 16.

Second Embodiment

Figure 8:
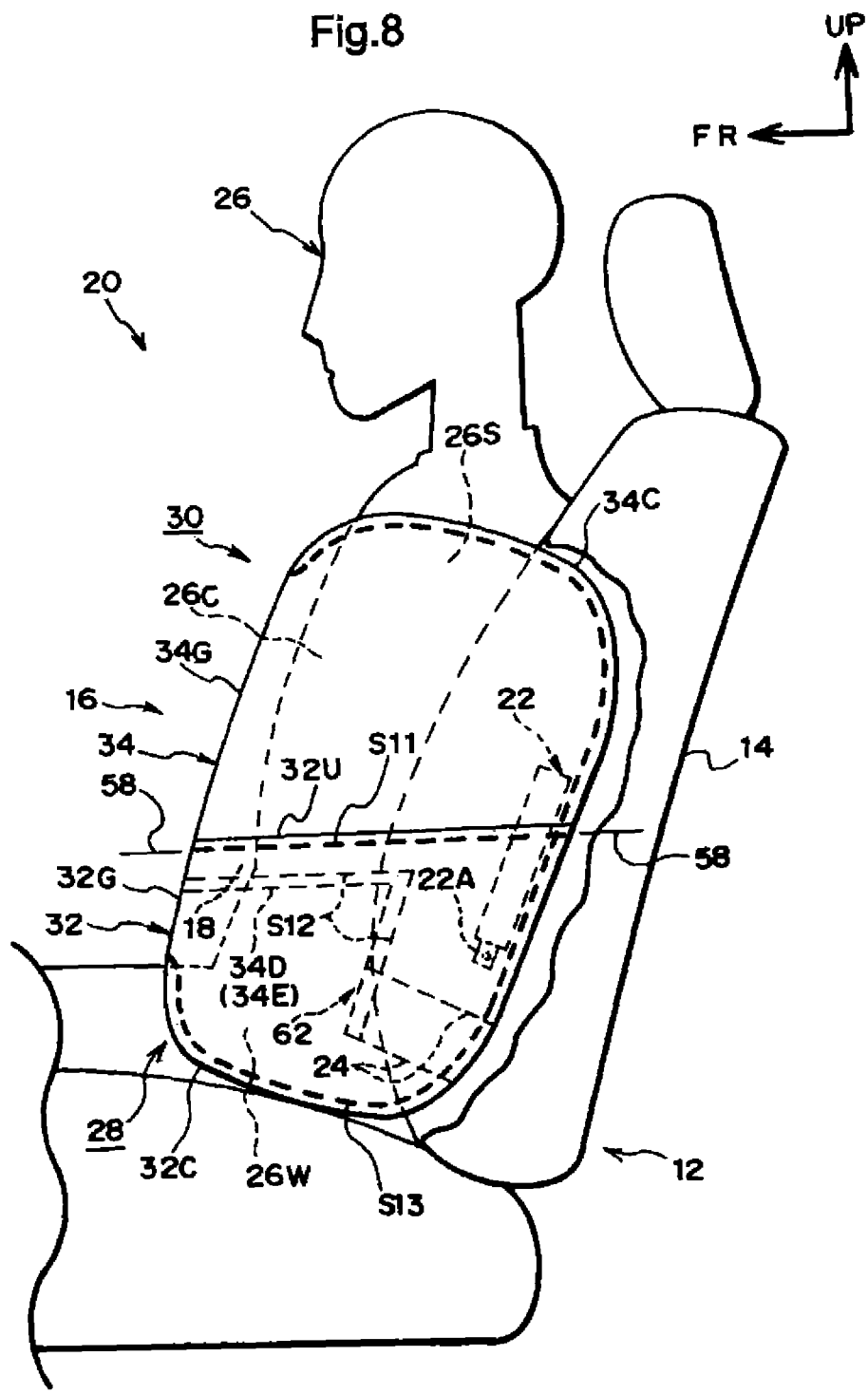

In FIG. 8, a side airbag device 20 for a vehicle relating to the present embodiment relates to, for example, a side airbag device that is installed in the side portion of the seat back 14 at the vehicle seat 12, and has the side airbag 16, the partitioning wall 18, the inflator 22, the check valve 24, and a diffuser 62.

Figure 9:
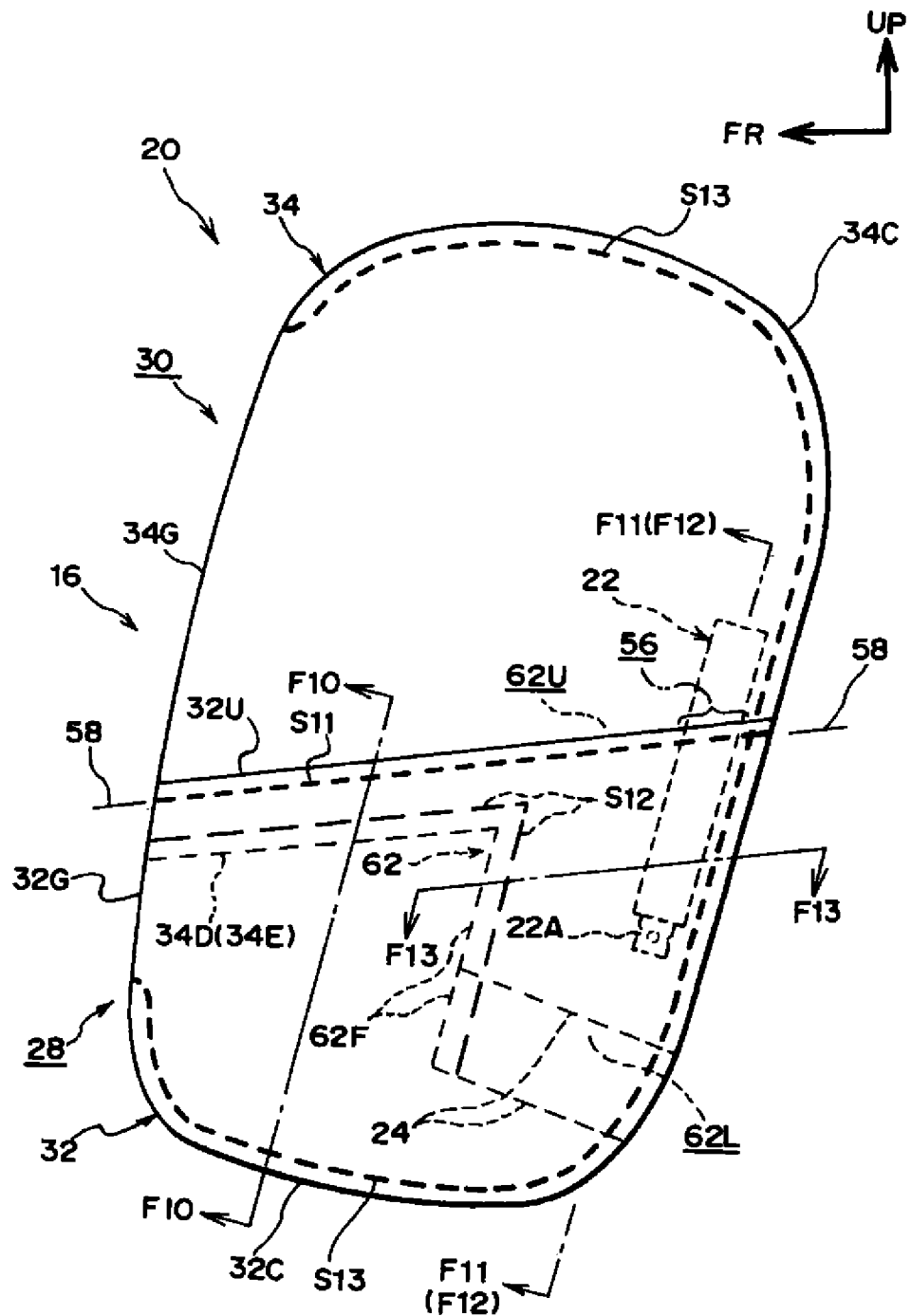
Figure 10:
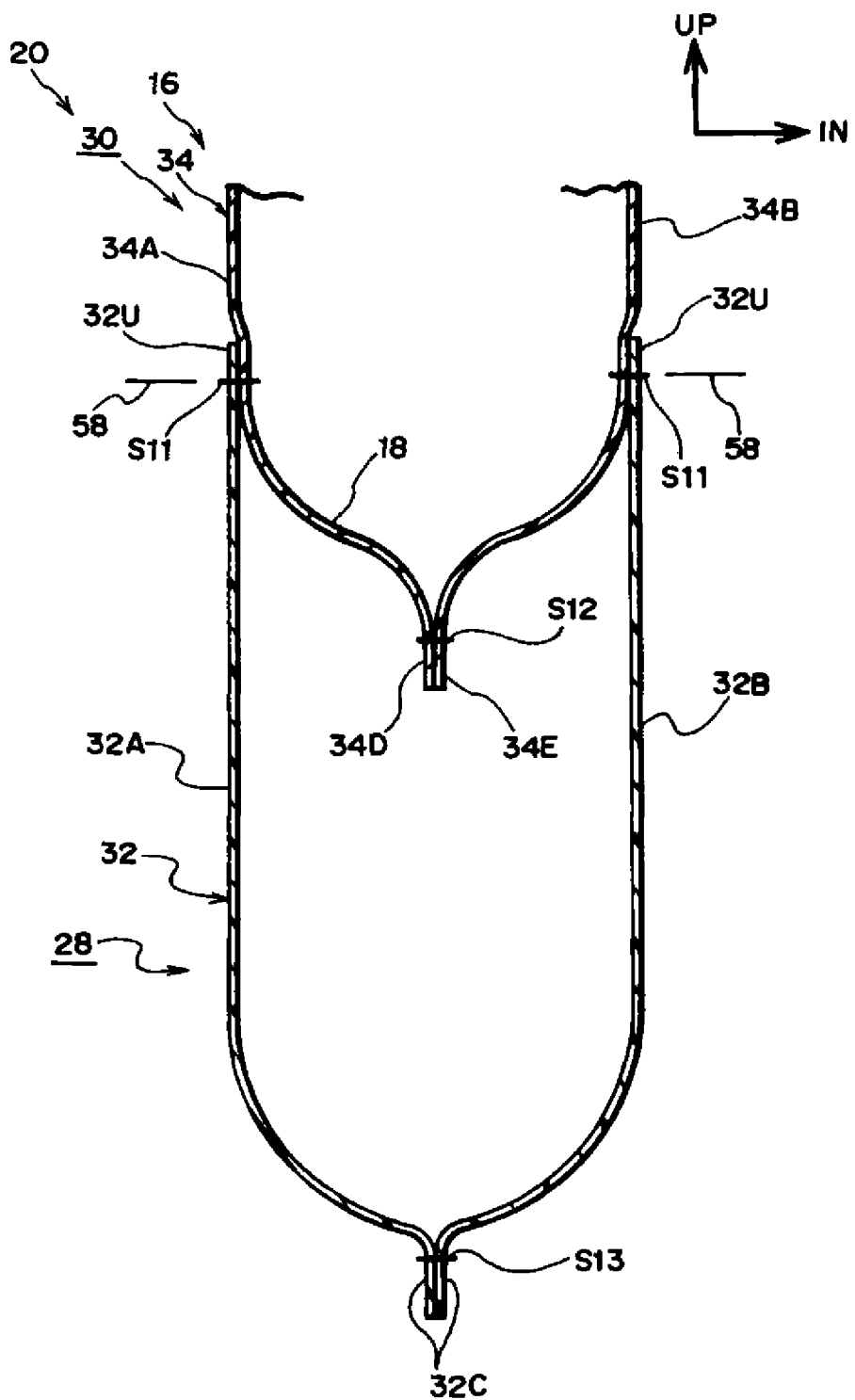
Figure 13:
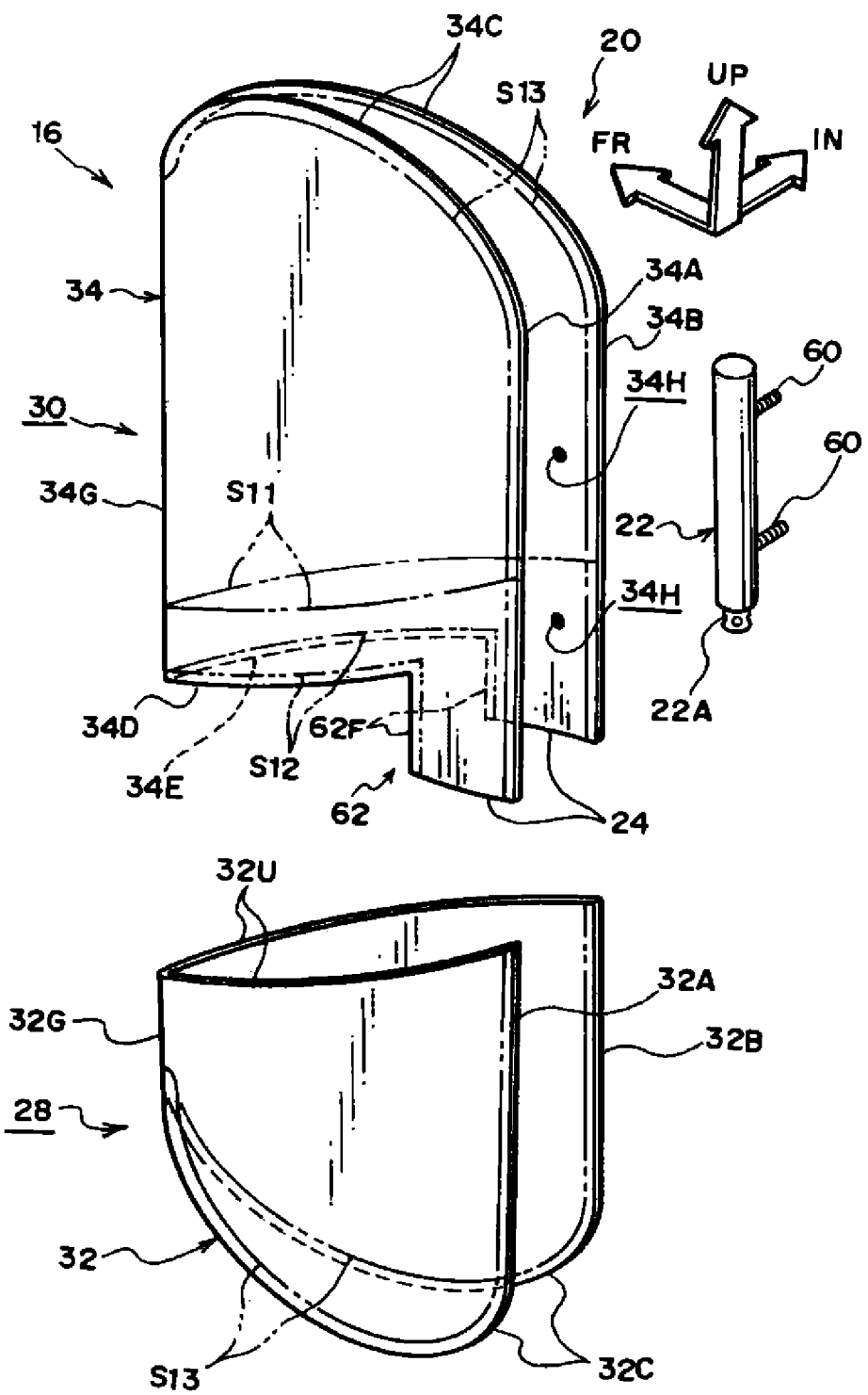
Figure 14:
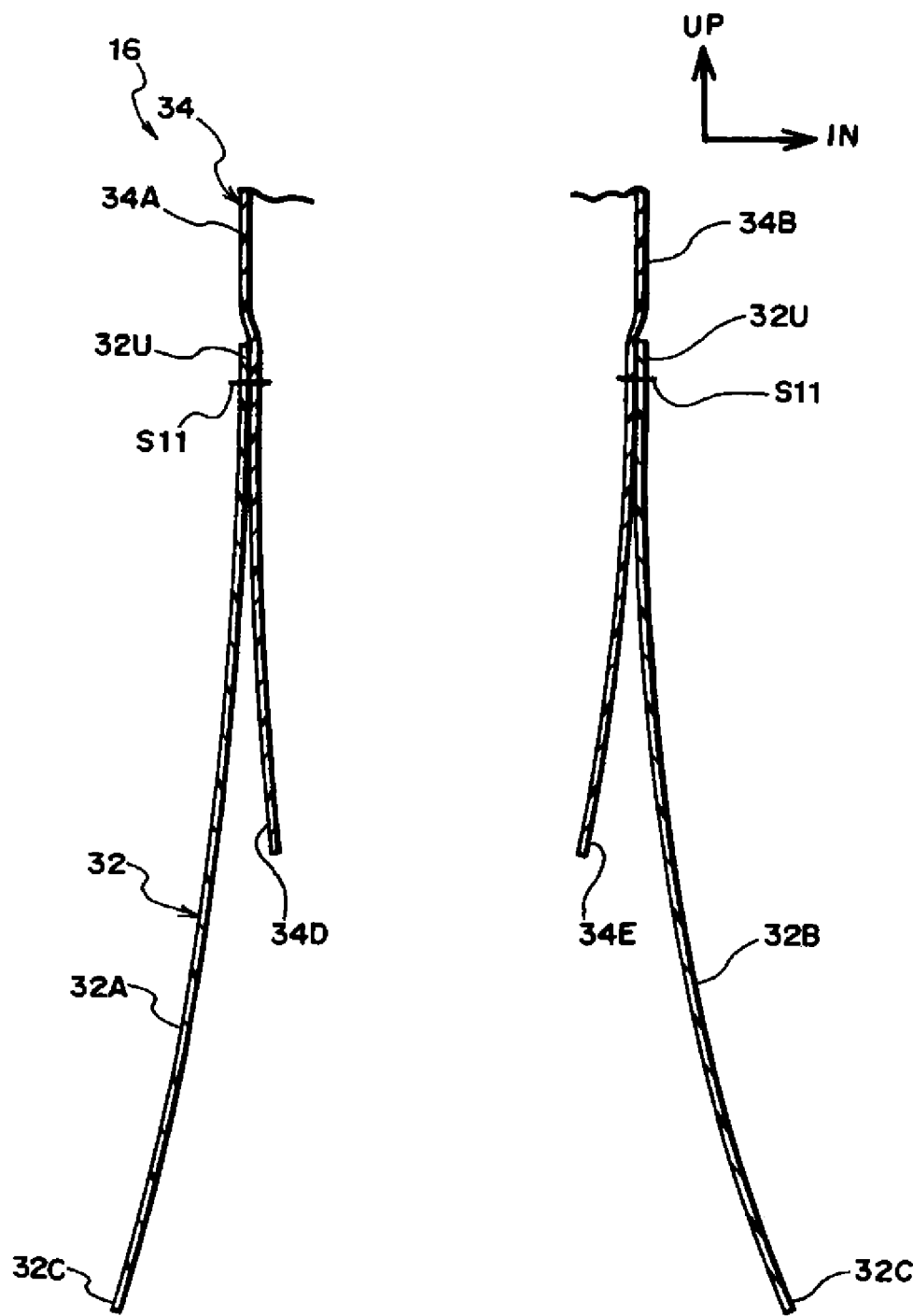
Figure 15:
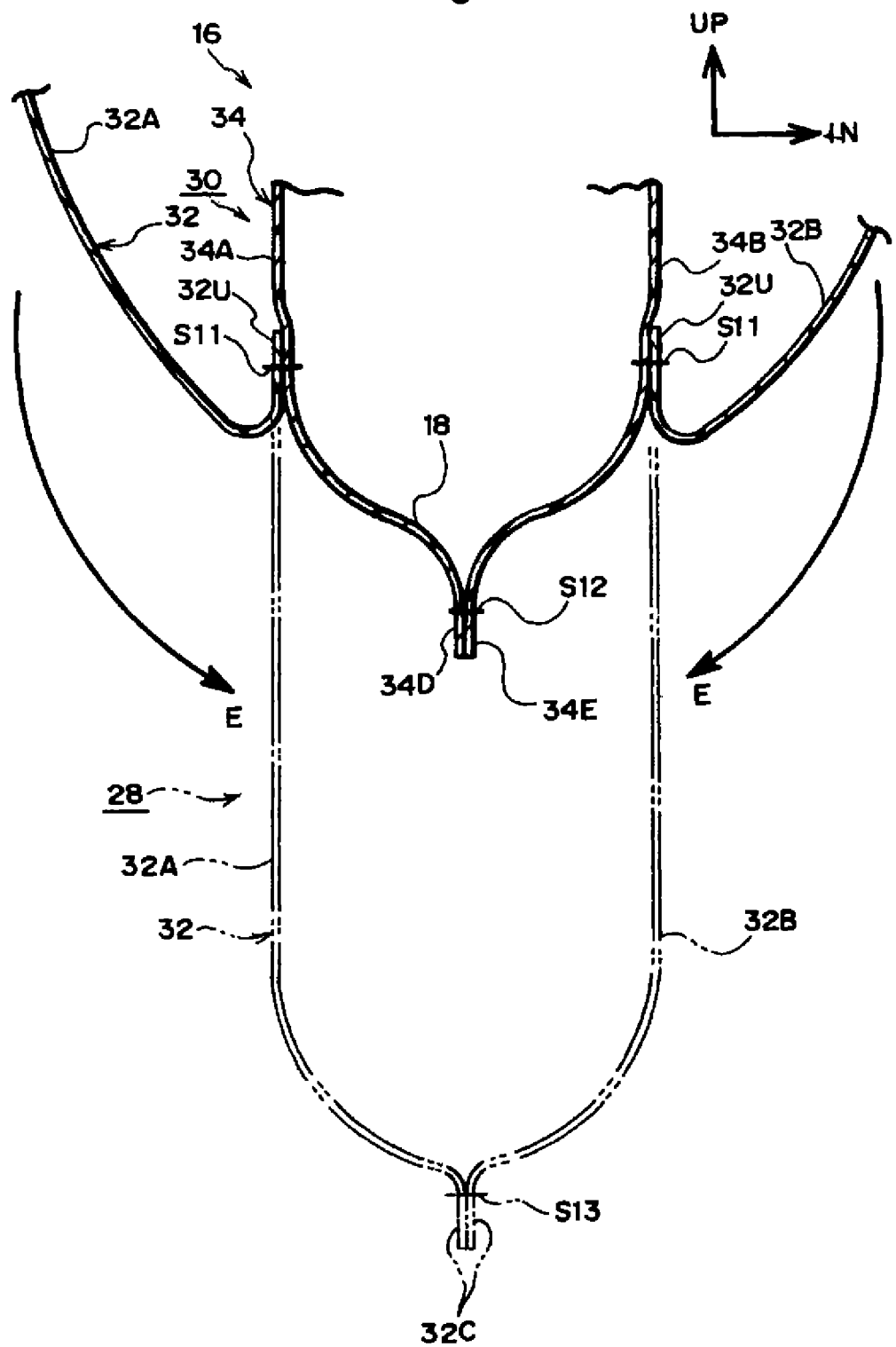

In FIG. 8 through FIG. 10, the side airbag 16 has the lower chamber 28 (high pressure chamber) and the upper chamber 30 (low pressure chamber) whose pressure is lower than the lower chamber 28. As shown in FIG. 13, the side airbag 16 is formed by the lower base cloth 32 and the upper base cloth 34 respectively being folded in two toward the vehicle rear side around front edge portions 32G, 34G thereof, and thereafter, as shown in FIG. 14, the upper end portion 32U of the lower base cloth 32 being sewn respectively with the outer base cloth 34A and the inner base cloth 34B of the upper base cloth 34 (sewn portions S11), and next, as shown in FIG. 15, the outer base cloth 32A and the inner base cloth 32I3 of the lower base cloth 32 respectively being turned upward and the lower ends 34D, 34E of the upper base cloth 34 being sewn, and, as shown in FIG. 13, an end edge 62F at the seat front side of the diffuser 62 being sewn (sewn portion S12), and thereafter, as shown in FIG. 15, the turned-up outer base cloth 32A and inner base cloth 32B of the lower base cloth 32 being returned in the arrow E directions, and the peripheral edge portion 32C of the lower base cloth 32 and the peripheral edge portion 34C of the upper base cloth 34 (FIG. 9, FIG. 13) being sewn together (sewn portion S13). As shown in FIG. 10, the region, of the upper base cloth 34, which region is divided by the sewn portions S11 at both sides in the bag thickness direction, is the partitioning wall 18.

Note that the sewing at the sewn portion S13 can be carried out at one time by sewing together the peripheral edge portions 32C, 34C in succession, but is not limited to this, and may be carried out separately. Further, the lower chamber 28 is not limited to being formed by sewing the peripheral edge portion 32C of the lower base cloth 32, and, for example, may be formed by hollow weaving. This is because the shape of the lower base cloth 32 is simpler than the upper base cloth 34 with which the diffuser 62 is formed integrally.

As shown in FIG. 9, the sewn portions S11 are provided rectilinearly in the vehicle longitudinal direction for example, and when the side airbag 16 in an inflated and deployed state is viewed in side view, the direction in which the sewn portions S11 extend is a border portion 58 between the upper chamber 30 and the lower chamber 28. Note that, as shown in FIG. 9, FIG. 11, in order to provide an insertion opening 56 of the inflator 22 into the side airbag 16, sewing S11 of the sewn portions S11 of the inner base cloths 32B, 34B may be partially omitted at the range that becomes the insertion opening 56.

Figure 11:
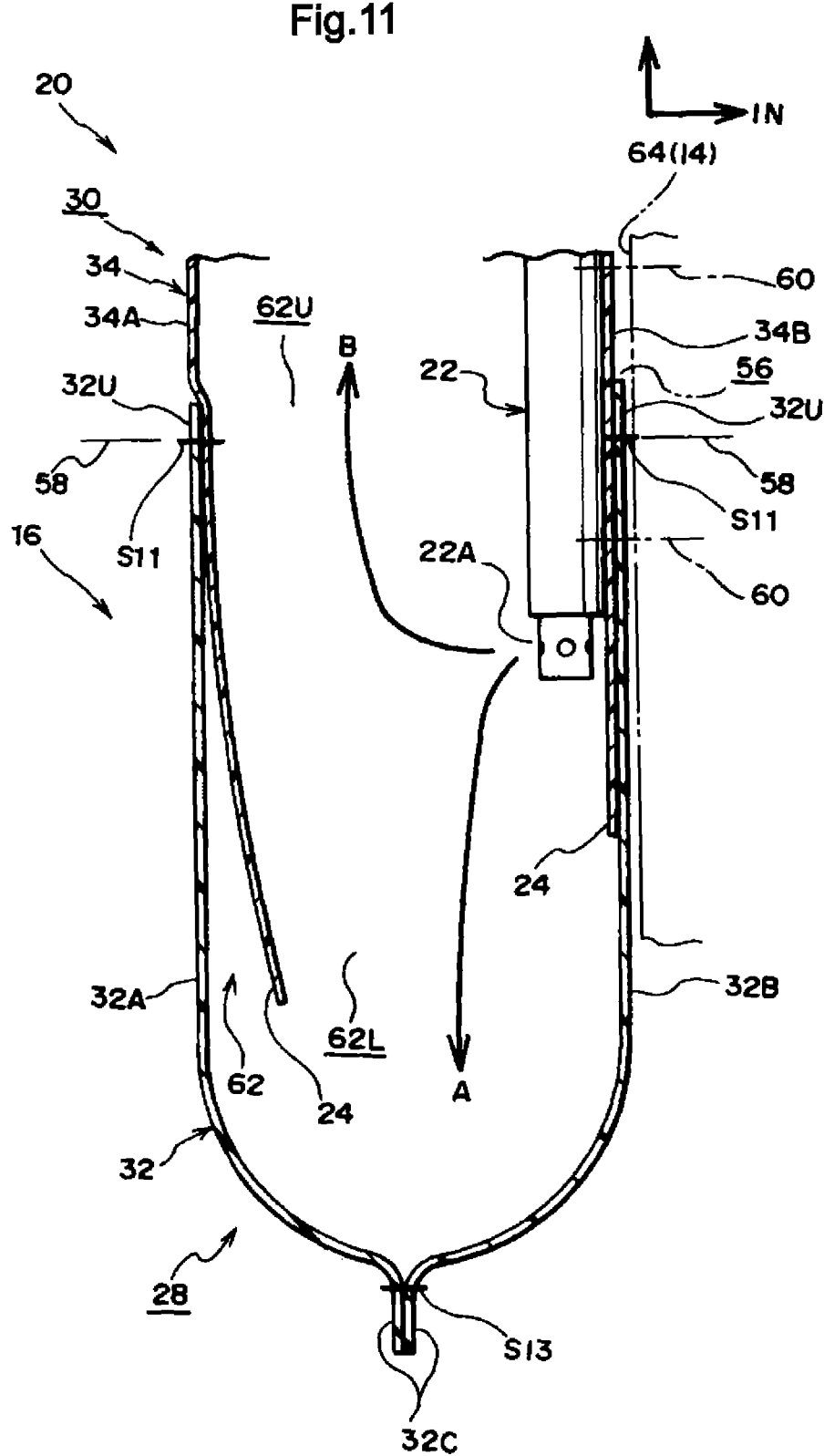

As shown in FIG. 11, FIG. 13, for example, two stud bolts 60, that extend toward the seat transverse direction inner side, are provided to stand at the inflator 22. As shown in FIG. 13, pass-through holes 34H, that are for the stud bolts 60 of the inflator 22 to pass through, are formed in the upper base cloth 34. The stud bolts 60 are passed through the pass-through holes 34H, and, as shown in FIG. 11, are passed through a seat back frame 64 within the seat back 14, and by fastening nuts (not shown) with the stud bolts 60, the inflator 22 is, together with the side airbag 16, fixed to the seat back frame 64.

In FIG. 9, even though the insertion opening 56 of the inflator 22 into the side airbag 16 is provided, because the insertion opening 56 is nipped between the inflator 22 and the seat back frame 64, flowing-out of gas from the insertion opening 56 is suppressed.

As shown in FIG. 8, FIG. 9, FIG. 11, the gas jetting-out portion 22A of the inflator 22 is positioned within the diffuser 62, at the lower chamber 28 side of the boundary portion 58 between the upper chamber 30 and the lower chamber 28. This is in order for the gas, that is jetted-out from the gas jetting-out portion 22A toward the radial direction outer side of the inflator 22, to be received at the inner wall of the diffuser 62 and preferentially led toward the lower chamber 28 side that is the high pressure chamber, and to be led also to the upper chamber 30 side that is the low pressure chamber.

Figure 12:
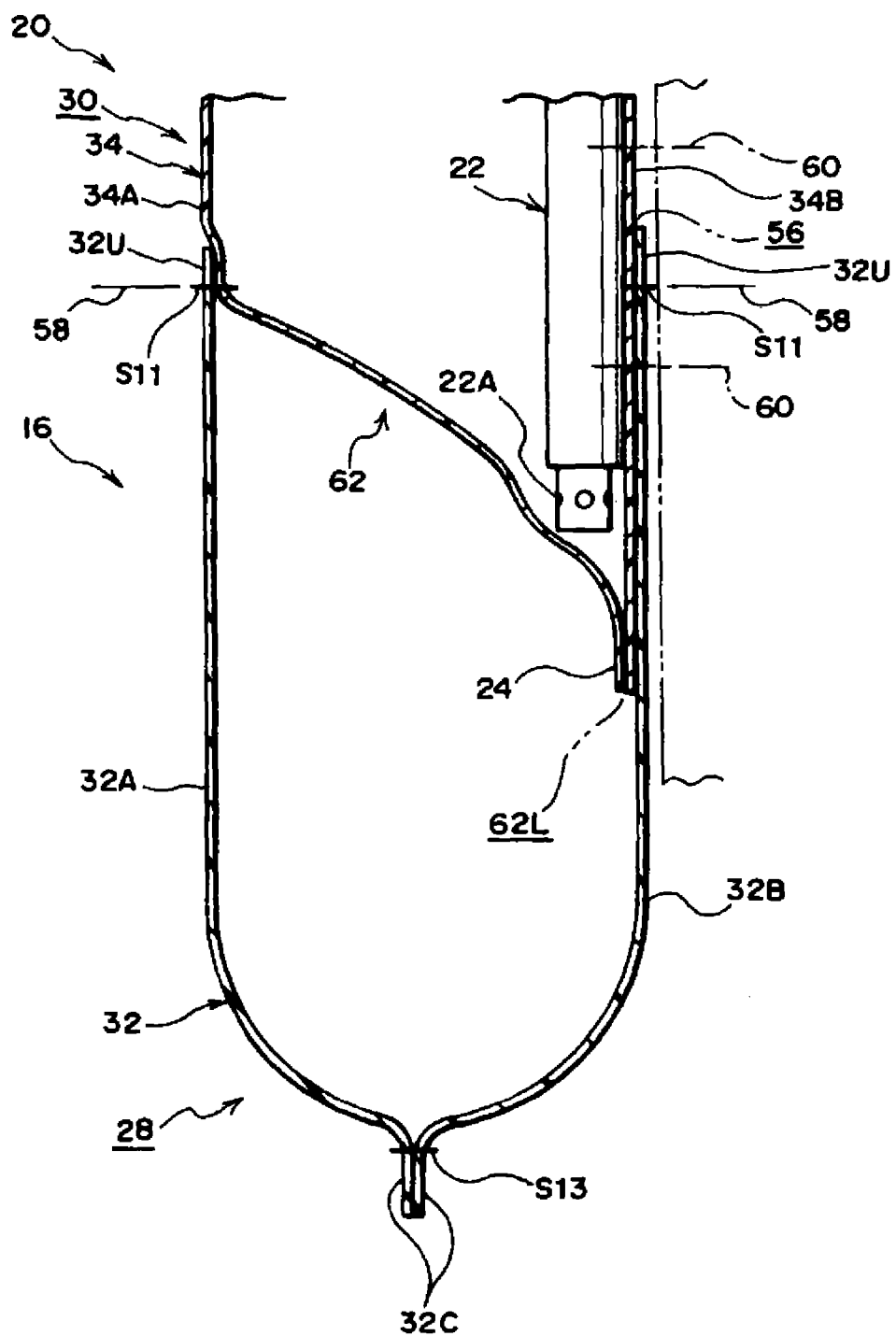

In FIG. 9, even though the insertion opening 56 for the inflator 22 is provided at the side airbag 16 by omitting a portion of the sewing at the sewn portions S11 of the inner base cloths 32B, 34B, as shown in FIG. 11, FIG. 12, the insertion opening 56 is closed-off due to the region where the inner base cloths 32B, 34B overlap being nipped between the inflator 22 and the seat back frame 64.

As shown in FIG. 8, FIG. 9, and FIG. 11 through FIG. 13, the diffuser 62 is provided at the partitioning wall 18, and is a region that distributes the gas, that is jetted-out from the gas jetting-out portion 22A of the inflator 22, mainly to the lower chamber 28 side that is the high pressure chamber, and that distributes the gas also to the upper chamber 30 side that is the low pressure chamber. This diffuser 62 is structured in the shape of a tube that is convex toward the lower chamber 28 side, by extending the seat rear end portion of the partitioning wall 18 further toward the seat lower side (the lower chamber 28 side) than the position of the lower ends 34D, 34E, and sewing the seat front side end edges 62F at the sewn portion S12, and sewing the peripheral edge portion 34C of the upper base cloth 34 at the sewn portion S13. The diffuser 62 being provided at the seat rear end portion of the partitioning wall 18 corresponds to the inflator 22, that is disposed within the diffuser 62, being fixed to the seat back frame 64 that is positioned at the seat rear end portion of the side airbag 16 at the time of inflation and deployment. As shown in FIG. 9, FIG. 11, a lower opening portion 62L that opens to the lower chamber 28, and an upper opening portion 62U that opens to the upper chamber 30, are provided at the diffuser 62.

In FIG. 8, FIG. 9, FIG. 10, FIG. 11, the check valve 24 is provided integrally with the partitioning wall 18 and the diffuser 62, and is a region that permits gas to flow from the upper chamber 30 side to the lower chamber 28 side, and that regulates flowing of gas from the lower chamber 28 side to the upper chamber 30 side. Concretely, due to the lower opening portion 62L of the diffuser 62 opening and closing, the lower opening portion 62L functions as the check valve 24.

As shown in FIG. 11, the check valve 24 opens due to the pressure of the gas jetted-out from the gas jetting-out portion 22A of the inflator 22 into the diffuser 62 at the time of operation of the inflator 22. On the other hand, as shown in FIG. 12, when the jetting-out of gas from the inflator 22 ends and gas attempts to flow backward from the lower chamber 28 that is the high pressure chamber to the upper chamber 30 that is the low pressure chamber, the check valve 24 closes due to this pressure.

The end edge at the seat rear side of the diffuser 62 is the peripheral portion 34C of the upper base cloth 34, and is sewn together with the peripheral edge portion 32C of the lower base cloth 32 at the sewn portion S13. Due thereto, when gas attempts to flow backward from the lower chamber 28 to the upper chamber 30, the check valve 24 (the lower opening portion 62L of the diffuser 62) inverting toward the upper chamber 30 side can be suppressed.

As shown in FIG. 11, FIG. 12, of the base cloths that structure the diffuser 62, the inner base cloth 34B of the upper base cloth 34 is nipped between the inflator 22 and the inner base cloth 32B of the lower base cloth 32, and therefore, when the check valve 24 closes, the outer base cloth 34A is deformed more and fits tightly to the inner base cloth 34B.

Accordingly, the length of the outer base cloth 34A at the position of the diffuser 62 is set to be longer toward the seat lower side than the inner base cloth 34B, so that the lower ends of the base cloths structuring the diffuser 62 fit tightly together at the same heightwise position at the time when the check valve 24 closes.

Note that the setting of the lengths of the base cloths that structure the diffuser 62 is not limited to this, and the length of the inner base cloth 34B may be made to be longer and may be made to be about the same length as the outer base cloth 34A. Conversely, the length of the inner base cloth 34B may be made to be short, and, for example, the position of the lower end of the inner base cloth 34B may be stopped at the position of the lower end 34E (FIG. 13), and the diffuser 62 and the check valve 24 may be structured by the outer base cloth 34A of the upper base cloth 34 and the inner base cloth 32B of the lower base cloth 32. In this case, the function of the check valve 24 is exhibited due to the outer base cloth 34A of the upper base cloth 34 fitting tightly to the inner base cloth 32B of the lower base cloth 32.

Because the other portions are similar to the first embodiment, the same portions are denoted by the same reference numerals in the drawings, and description thereof are omitted.

(Operation)

The present embodiment is structured as described above, and the operation thereof is described hereafter. In FIG. 8 through FIG. 10, at the side airbag device 20 for a vehicle relating to the present embodiment, the partitioning wall 18 is provided integrally with a portion of the upper base cloth 24, and the diffuser 62 and the check valve 24 are provided integrally with the partitioning wall 18. Therefore, as compared with a structure in which the partitioning wall 18, the diffuser 62 and the check valve 24 are provided separately, the costs required for sewing the side airbag 16 are reduced and the productivity can be improved. Further, because the diffuser 62 is structured by the seat rear end portion of the partitioning wall 18 extending further toward the seat lower side (the lower chamber 28 side) than the position of the lower ends 34D, 34E, the structure is simple. Therefore, compactness and lightening of the weight of the package formed by the side airbag 16 being folded-up can be devised.

Operation of the side airbag device 20 for a vehicle at the time of a side collision is described next. At the time of a side collision, in the same way as the first embodiment, a large amount of gas is jetted-out from the gas jetting-out portion 22A of the inflator 22. In the present embodiment, because the gas jetting-out portion 22A is disposed within the diffuser 62, the gas that is jetted-out from the gas jetting-out portion 22A is distributed by the diffuser 62 and supplied to the lower chamber 28 and the upper chamber 30. Due thereto, as shown in FIG. 8, the side airbag 16 inflates from the side portion of the seat back 14, and inflates and deploys toward between the vehicle side portion (not shown) and the passenger 26. At this time, flowing-in of gas from the upper chamber 30 side to the lower chamber 28 side is permitted, and flowing-out of gas from the lower chamber 28 side to the upper chamber 30 side is regulated, by the check valve 24 of the diffuser 62.

Concretely, as shown in FIG. 11, due to the pressure of the gas that is jetted-out into the diffuser 62 from the gas jetting-out portion 22A of the inflator 22, the lower opening portion 62L of the diffuser 62 that structures the check valve 24 opens. Due thereto, gas is supplied in the arrow A direction from within the diffuser 62 into the lower chamber 28 through the lower opening portion 62L, and the lower chamber 28 inflates and deploys, and gas is supplied in the arrow B direction from within the diffuser 62 into the upper chamber 30 through the upper opening portion 62U, and the upper chamber 30 inflates and deploys.

Here, the diffuser 62 is structured in the shape of a tube that is convex toward the lower chamber 28 side from the boundary portion 58 between the upper chamber 30 and the lower chamber 28, and the gas jetting-out portion 22A of the inflator 22 is disposed within the diffuser 62. Therefore, the gas that is jetted-out from the gas jetting-out portion 22A is supplied more preferentially to the lower chamber 28 than the upper chamber 30. Accordingly, the internal pressure of the lower chamber 28 becomes a higher pressure than the internal pressure of the upper chamber 30.

Next, as shown in FIG. 12, when the jetting-out of gas from the inflator 22 ends and gas attempts to flow backward from the lower chamber 28 that is the high pressure chamber to the upper chamber 30 that is the low pressure chamber, the check valve 24 (the lower opening portion 62L) becomes a state of being closed by the pressure of the gas. Accordingly, when the jetting-out of gas from the inflator 22 ends, the internal pressure of the lower chamber 28 can be maintained in a high pressure state over a longer time period.

The seat rear side end edge of the diffuser 62 that has the check valve 24 is the peripheral edge portion 34C of the upper base cloth 34, and the peripheral edge portion 34C is sewn with the peripheral edge portion 32C of the lower base cloth 32. Therefore, when the gas attempts to flow backward from the lower chamber 28 to the upper chamber 30, the check valve 24 (the lower opening portion 62L of the diffuser 62) inverting toward the upper chamber 30 side is suppressed. Thus, the internal pressure of the lower chamber 28 can more stably be maintained in a high pressure state.

As described above, the respective portions of the upper body of the passenger 26 can be appropriately restrained by the side airbag 16 that is inflated and deployed. Concretely, as shown in FIG. 1, the waist portion 26W of the passenger 26 seated in the vehicle seat 12 can be restrained by the lower chamber 28 that is relatively high pressure, and both the chest portion 26C and the shoulder portion 26S of the passenger 26 can be restrained by the upper chamber 30 that is relatively low pressure. Further, because the internal pressure of the lower chamber 28 can be maintained by the check valve 24 over a longer time period, the passenger restraining performance at the time of a side collision can be improved more.

Modified Example 1

Figure 16:
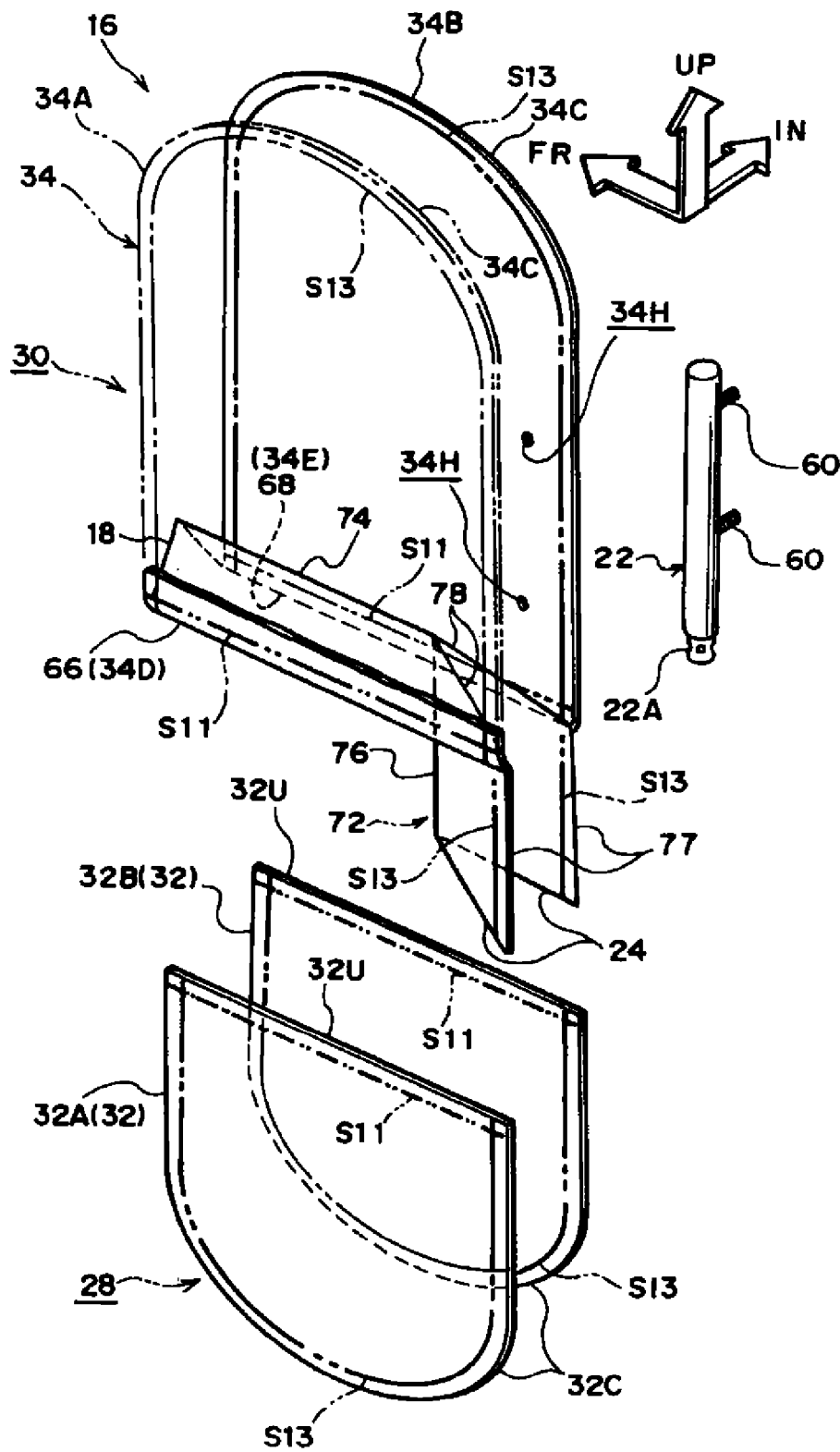
Figure 17:
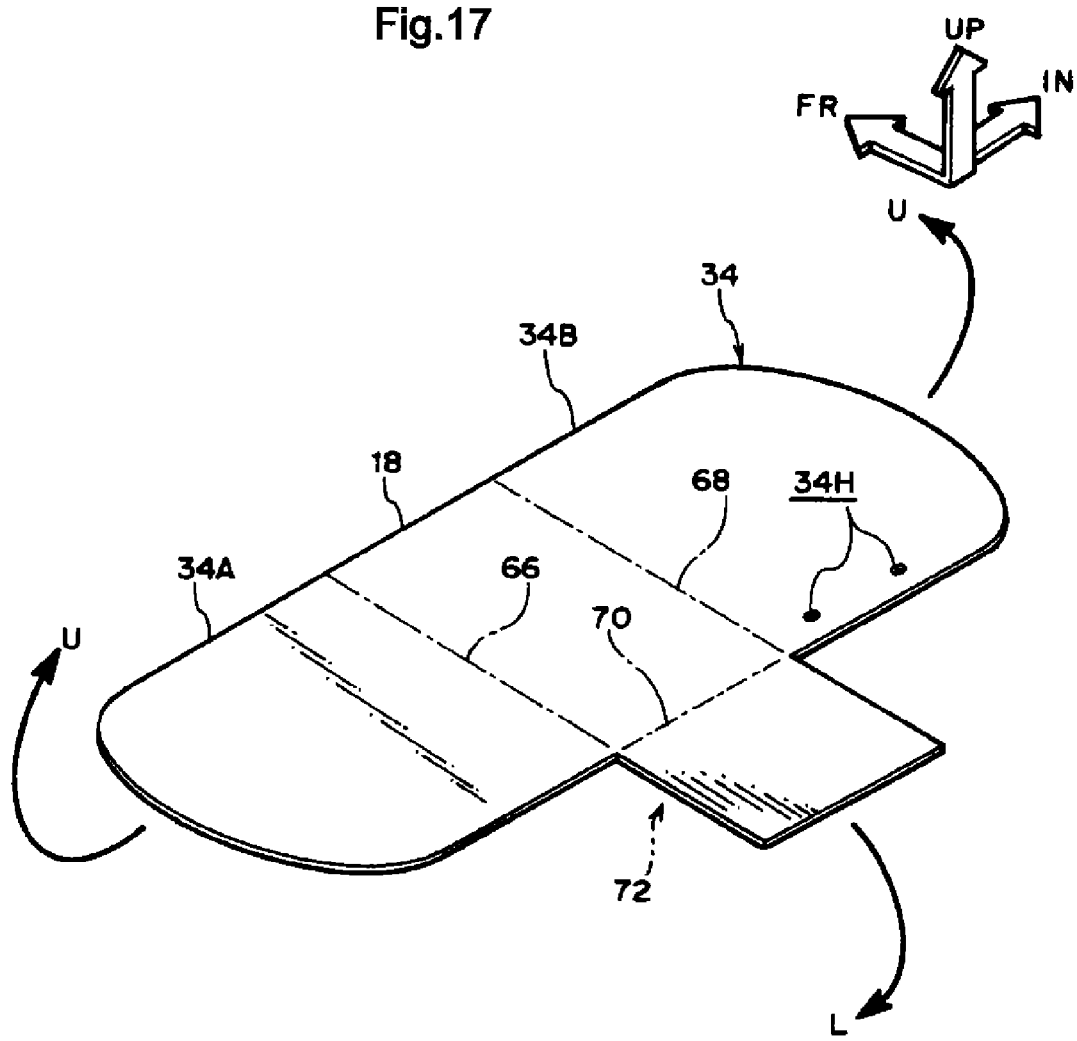
Figure 18:
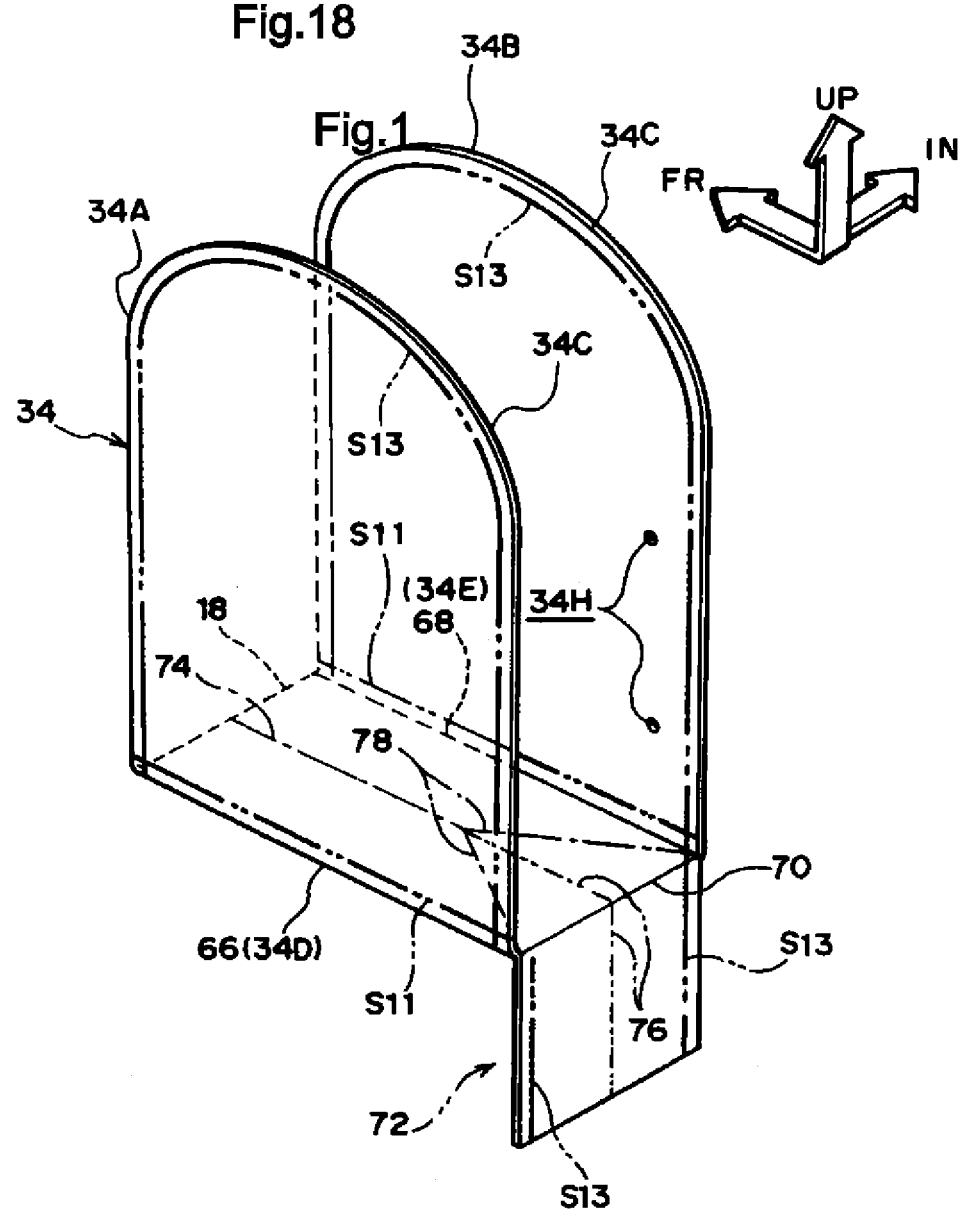

From FIG. 16 to FIG. 18, at the side airbag 16 relating to modified example 1, the partitioning wall 18 and a diffuser 72 are formed by the one upper base cloth 34 being folded. FIG. 17 is a perspective view showing a development state of the upper base cloth 34. At this upper base cloth 34, the region that becomes the partitioning wall 18 is provided between the region that becomes the outer base cloth 34A and the region that becomes the inner base cloth 34B, and the region that becomes the diffuser 72 is provided at the seat rear side of the region that becomes the partitioning wall 18. As shown in FIG. 16, the region that becomes the diffuser 72 is formed to project toward the seat rear side of the region that becomes the partitioning wall 18, as shown in FIG. 17. Note that a portion of the region that becomes the partitioning wall 18 also structures the diffuser 72.

With regard to this upper base cloth 34, when the region that becomes the outer base cloth 34A and the region that becomes the inner base cloth 34B are respectively folded in the arrow U directions around fold lines 66, 68, and the region that becomes the diffuser 72 is folded in the arrow L direction around a fold line 70, there becomes the state shown in FIG. 18. When, from this state, the region that becomes the partitioning wall 18 is folded convexly toward the seat upper side (the upper chamber 30 side) around a fold line 74, and the region that becomes the diffuser 72 is folded convexly toward the seat front side around a fold line 76 that is continuous with the fold line 74, there becomes the state shown in FIG. 16.

At this time, the fold line 70 disappears, and by folding a portion of the region that becomes the partitioning wall 18 around a fold line 78, the diffuser 72 is formed. End edges 77 at the seat rear side of the diffuser 72 are nipped in the peripheral edge portion 32C of the lower base cloth 32, and sewn together at the sewn portion S13. The diffuser 72 thereby becomes the shape of a tube. Note that, because the fold line 70 disappears in the process of forming the diffuser 72, the process of folding the region that becomes the diffuser 72 in the arrow L direction around the fold line 70 in FIG. 17 may be omitted.

In FIG. 16, at the lower base cloth 32, for example, the outer base cloth 32A and the inner base cloth 32B are respectively independent, and the upper end portion 32U of the outer base cloth 32A is sewn at the sewn portion S11 to the lower end 34D of the outer base cloth 34A at the upper base cloth 34. Further, the upper end portion 32U of the inner base cloth 32B is sewn at the sewn portion S11 to the lower end 34E of the inner base cloth 34B at the upper base cloth 34.

Modified Example 2

Figure 19:
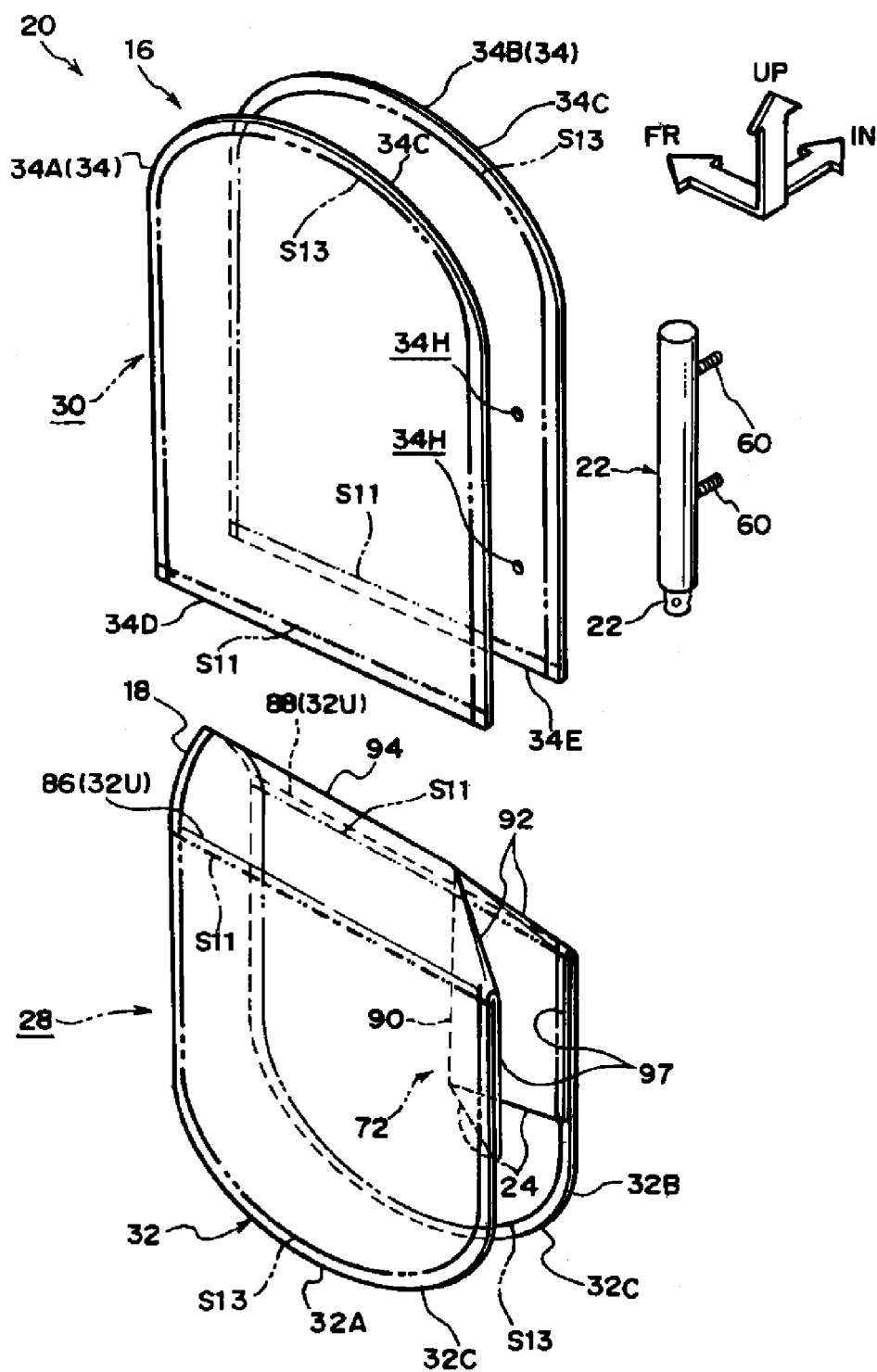
Figure 20:
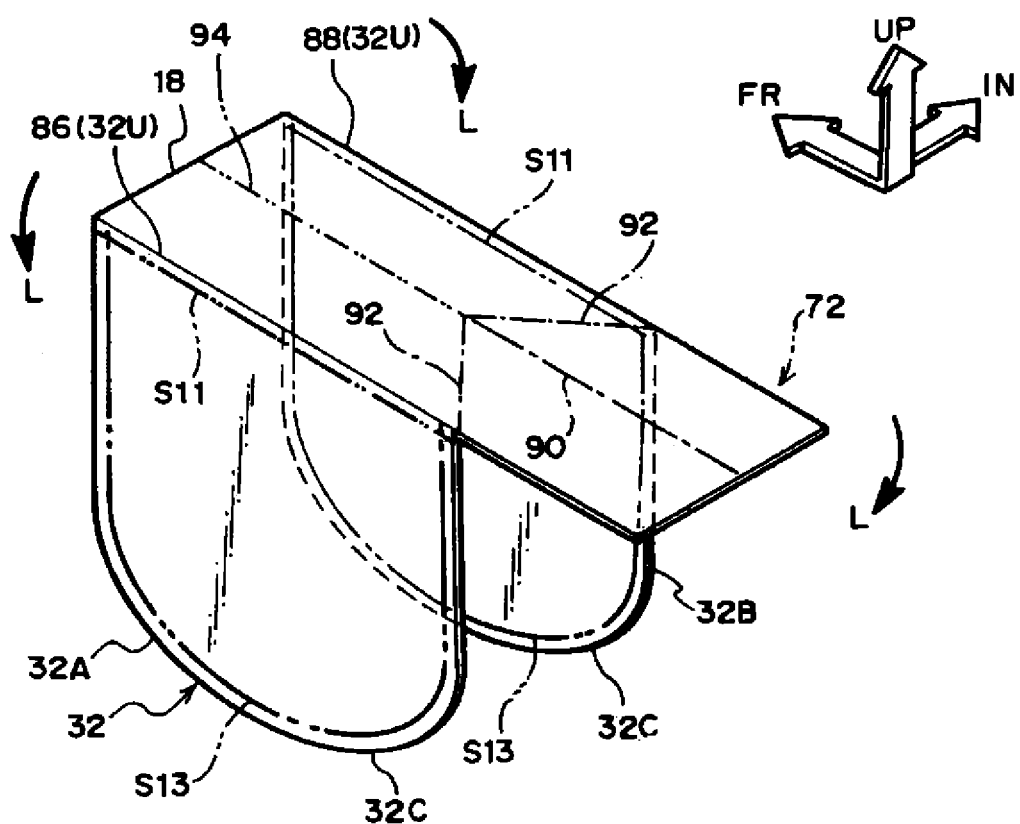

In FIG. 19, FIG. 20, at the side airbag 16 relating to modified example 2, the partitioning wall 18 and the diffuser 72 are formed by the one lower base cloth 32 being folded. At this lower base cloth 32, the region that becomes the partitioning wall 18 is provided between the region that becomes the outer base cloth 32A and the region that becomes the inner base cloth 32B, and the region that becomes the diffuser 72 is provided at the seat rear side of the region that becomes the partitioning wall 18. As shown in FIG. 20, the region that becomes this diffuser 72 is formed to project toward the seat rear side of the region that becomes the partitioning wall 18. Note that a portion of the region that becomes the partitioning wall 18 also structures the diffuser 72.

As shown in FIG. 20, with regard to the lower base cloth 32, when the region that becomes the outer base cloth 32A and the region that becomes the inner base cloth 32B are folded in the arrow L directions respectively around fold lines 86, 88, and the region that becomes the partitioning wall 18 is folded convexly toward the seat upper side (the upper chamber 30 side) around a fold line 94, and the region that becomes the diffuser 72 is folded in the arrow L direction and convexly toward the seat front side around fold lines 90, 92, there becomes the state shown in FIG. 19. End edges 97 at the seat rear side of the diffuser 72 are nipped in the peripheral edge portion 32C of the lower base cloth 32, and sewn together at the sewn portion S13. The diffuser 72 thereby becomes the shape of a tube.

In FIG. 19, at the upper base cloth 34, the outer base cloth 34A and the inner base cloth 34B are respectively separate bodies, and the lower end 34D of the outer base cloth 34A is sewn at the sewn portion S11 to the upper end portion 32U that is positioned in a vicinity of the fold line 86 of the outer base cloth 32A at the lower base cloth 32. Further, the lower end 34E of the inner base cloth 34B is sewn at the sewn portion S11 to the upper end portion 32U that is positioned in a vicinity of the fold line 88 of the inner base cloth 32B at the lower base cloth 32.

Modified Example 3

In FIG. 21, FIG. 22, at the side airbag 16 relating to modified example 3, the partitioning wall 18 is formed by, of the lower base cloth 32 (high pressure chamber base cloth), an end portion 98 at the upper chamber 30 side of the outer base cloth 32A (high pressure chamber outer base cloth) that is positioned at the seat transverse direction outer side of the vehicle seat 12 (see FIG. 8), being sewn to, of the lower base cloth 32, the inner base cloth 32B (high pressure chamber inner base cloth) that is positioned at the seat transverse direction inner side.

Concretely, at the lower base cloth 32, the outer base cloth 32A and the inner base cloth 32B are respectively separate bodies, and the partitioning wall 18 is formed by, of the outer base cloth 32A, the region that becomes the partitioning wall 18 being folded so as to become convex toward the upper chamber 30 side around fold lines 100, 102, 104, and, at the sewn portion S11, the end portion 98 being sewn to the inner surface of the inner base cloth 32B.

Further, the check valve 24 and a diffuser 96 are formed by, at the seat rear side within the side airbag 16, providing an extending portion 106 toward the upper chamber 30 side at the end portion 98 at the upper chamber 30 side of the outer base cloth 32A, and folding the extending portion 106 over toward the lower chamber 28 side, and sewing an end edge 108 at the seat front side of the extending portion 106, at sewn portion S14, to, of the lower base cloth 32 (high pressure chamber base cloth), the inner base cloth 32B (high pressure chamber inner base cloth) that is positioned at the seat transverse direction inner side, and sewing an end edge 110 at the seat rear side of the extending portion 106, at the sewn portion 513, to the inner base cloth 32B.

Namely, the check valve 24 and the diffuser 96 are structured by the extending portion 106 of the outer base cloth 32A and the inner base cloth 3213, and the gas jetting-out portion 22A of the inflator 22 is disposed within the diffuser 96. Note that the folding-over of the extending portion 106 at the outer base cloth 32A is completed accompanying the folding-over, at the fold lines 100, 102, 104, of the region that becomes the partitioning wall 18.

In FIG. 21, at the upper base cloth 34, the outer base cloth 34A and the inner base cloth 34B are respectively separate bodies, and the lower end 34D of the outer base cloth 34A is sewn at the sewn portion S11 to the upper end portion 32U that is positioned in a vicinity of the fold line 100 of the outer base cloth 32A at the lower base cloth 32. Similarly, the lower end 34E of the inner base cloth 34B is sewn at the sewn portion S11 to the upper end portion 32U of the inner base cloth 3213 at the lower base cloth 32. Accordingly, the sewing of the end portion 98 of the outer base cloth 32A and the lower end 34E of the upper base cloth 34 to the upper end portion 32U of the inner base cloth 32B is carried out at one time at the sewn portion S11.

Note that, because the diffuser 96 must communicate with the lower chamber 28 and the upper chamber 30, the diffuser 96 must not be closed-off by the sewn portion S11 at the time of sewing the end portion 98 of the outer base cloth 32A to the inner base cloth 321S. On the other hand, gas leakage from the sewn portion S11 of the inner base cloth 32B of the lower base cloth 32 and the inner base cloth 34B of the upper base cloth 34 should be suppressed. Accordingly, when it is difficult to sew the respective portions at one time at the sewn portion 511, the sewing of the inner base cloth 34B of the upper base cloth 34 to the inner base cloth 32B of the lower base cloth 32 may be carried out separately from the sewing of the end portion 98 of the outer base cloth 32A to the inner base cloth 32B.

Modified Example 4

In FIG. 23, at the side airbag 16 relating to modified example 4, the partitioning wall 18 is formed by sewing, of the upper base cloth 34 (low pressure chamber base cloth), an end portion 112 at the lower chamber 28 side of the outer base cloth 34A (low pressure chamber outer base cloth) that is positioned at the seat transverse direction outer side of the vehicle seat 12 (FIG. 8), to, of the upper base cloth 34, the inner base cloth 34B (low pressure chamber inner base cloth) that is positioned at the seat transverse direction inner side.

At the upper base cloth 34, the outer base cloth 34A and the inner base cloth 34B are respectively separate bodies, and, at the lower base cloth 32 as well, the outer base cloth 32A and the inner base cloth 32B are respectively separate bodies. The partitioning wall 18 is formed by, at the upper base cloth 34, the region that becomes the partitioning wall 18 of the outer base cloth 34A being folded so as to become convex toward the lower chamber 28 side at the positions of fold lines 114, 116, and the end portion 112 being sewn to the lower end 34E of the inner base cloth 34B at the sewn portion S11.

Further, the check valve 24 and a diffuser 126 are formed by, at the seat rear side within the side airbag 16, an extending portion 118 toward the lower chamber 28 side being provided at the end portion 112 at the lower chamber 28 side of the outer base cloth 34A, and an end edge 122 at the seat front side of the extending portion 118 being sewn at the sewn portion S14 to, of the lower base cloth 32 (high pressure chamber base cloth), the inner base cloth 32B (high pressure chamber inner base cloth) that is positioned at the seat transverse direction inner side, and an end edge 124 at the seat rear side of the extending portion 118 being sewn at the sewn portion S13 to the inner base cloth 32B. Namely, the check valve 24 and the diffuser 126 are structured from the extending portion 118 of the outer base cloth 32A and the inner base cloth 32B.

Note that, because the partitioning wall 18 is folded so as to become convex toward the lower chamber 28 side, the end portion 112 at which the extending portion 118 is provided faces the upper chamber 30 side. Accordingly, the extending portion 118 is folded, with respect to the partitioning wall 18, toward the lower chamber 28 side around a fold line 120 that is continuous with the end portion 112.

The lower end 34D of the outer base cloth 34A is sewn at the sewn portion S11 to the upper end portion 32U of the outer base cloth 32A at the lower base cloth 32. Similarly, the lower end 34E of the inner base cloth 34B is sewn at the sewn portion S11 to the upper end portion 32U of the inner base cloth 32B at the lower base cloth 32. Accordingly, the sewing of the end portion 112 of the outer base cloth 32A and the lower end 34E of the upper base cloth 34 to the upper end portion 32U of the inner base cloth 32B is carried out at one time at the sewn portion S11.

Note that, because the diffuser 126 must communicate with the lower chamber 28 and the upper chamber 30, the diffuser 126 must not be closed-off by the sewn portion S11 at the time of sewing the end portion 112 of the outer base cloth 34A to the inner base cloth 34B. On the other hand, gas leakage from the sewn portion S11 of the inner base cloth 32B of the lower base cloth 32 and the inner base cloth 34B of the upper base cloth 34 should be suppressed. Accordingly, when it is difficult to sew the respective portions at one time at the sewn portion S11, the sewing of the inner base cloth 34B of the upper base cloth 34 to the inner base cloth 32B of the lower base cloth 32 may be carried out separately from the sewing of the end portion 112 of the outer base cloth 34A to the inner base cloth 32B.

In accordance with above-described modified example 3 and modified example 4, because the used amount of the base cloth that is needed in order to form the diffuser 96, 126 can be reduced, costs can be further reduced, and further, the folded-up dimensions (packaged dimensions) of the side airbag 16 can be made to be smaller and lighter-weight.

Other Embodiments

The side airbag 16 in the respective embodiments is made to be a two-chamber structure having the lower chamber 28 that serves as a high pressure chamber and the upper chamber 30 that serves as a low pressure chamber, but the arrangement of the high pressure chamber and the low pressure chamber is not limited to this. For example, the side airbag 16 may be made to be a three-layer structure by further providing an uppermost chamber (not illustrated), that corresponds to the shoulder portion 26S of the passenger 26, as a high pressure chamber at the vehicle upper side of the upper chamber 30 that serves as the low pressure chamber. In this case, a diffuser and a check valve are provided (not shown) at the uppermost chamber side as well. This diffuser can be easily provided by turning upside-down the diffuser 36, 62, 72, 96 in the above embodiments.

Further, in FIG. 1, FIG. 8, the side airbag device 10, 20 for a vehicle is not limited to being installed in the vehicle seat 12, and may be installed, for example, within the trim of a vehicle side portion.

DESCRIPTION OF THE REFERENCE NUMERALS 10 side airbag device for vehicle
12 vehicle seat
16 side airbag
18 partitioning wall
20 side airbag device for vehicle
22 inflator
22A gas jetting-out portion
24 check valve
28 lower chamber (high pressure chamber)
30 upper chamber (low pressure chamber)
32 lower base cloth (high pressure chamber base cloth)
32A outer base cloth (high pressure chamber outer base cloth)
32B inner base cloth (high pressure chamber inner base cloth)
34 upper base cloth (low pressure chamber base cloth)
34A outer base cloth (low pressure chamber outer base cloth)
34B inner base cloth (low pressure chamber inner base cloth)
36 diffuser
62 diffuser
72 diffuser
96 diffuser
98 end portion at low pressure chamber side of high pressure chamber outer base cloth
106 extending portion
108 end edge at seat front side
110 end edge at seat rear side
112 end portion at high pressure chamber side of low pressure chamber outer base cloth
118 extending portion
122 end edge at seat front side
124 end edge at seat rear side
126 diffuser

The invention claimed is:

1. A side airbag device for a vehicle, comprising:
a side airbag having a high pressure chamber that becomes a high pressure side at a time of inflation and deployment, and a low pressure chamber that becomes a lower pressure than the high pressure chamber, the high pressure chamber and the low pressure chamber each inflating and deploying at a time of a side collision;
a partitioning wall that is formed by an end portion of an outer base cloth that is positioned at a seat transverse direction outer side of a vehicle seat, and an end portion of an inner base cloth that is positioned at a seat transverse direction inner side, the end portion of the outer base cloth and the end portion of the inner base cloth being part of either a high pressure chamber base cloth or a low pressure chamber base cloth, the end portion of the outer base cloth and the end portion of the inner base cloth being sewn together, the partitioning wall dividing the high pressure chamber and the low pressure chamber;
an inflator that, at a time of a side collision, jets-out gas for inflation from a gas jetting-out portion, and supplies gas to an interior of the side airbag; and
a check valve that is provided integrally with the partitioning wall, and that is formed by at least one of the outer base cloth or the inner base cloth extending toward a high pressure chamber side, at a seat rear side within the side airbag, and that permits flowing of gas, jetted-out from the gas jetting-out portion of the inflator, from the low pressure chamber to the high pressure chamber, and that regulates flowing of gas in an opposite direction.

2. The side airbag device for a vehicle of claim 1, wherein a diffuser that distributes gas, jetted-out from the gas jetting-out portion of the inflator, mainly to a high pressure chamber side, and that distributes the gas also to a low pressure chamber side, is provided integrally with the partitioning wall.

3. The side airbag device for a vehicle of claim 2, wherein coating for increasing air-tightness is carried out on an inner surface of the high pressure chamber base cloth.

4. The side airbag device for a vehicle of claim 1, wherein coating for increasing air-tightness is carried out on an inner surface of the high pressure chamber base cloth.

5. A side airbag device for a vehicle, comprising:
a side airbag having a high pressure chamber that becomes a high pressure side at a time of inflation and deployment, and a low pressure chamber that becomes a lower pressure than the high pressure chamber, the high pressure chamber and the low pressure chamber each inflating and deploying at a time of a side collision;
a partitioning wall that is formed by an end portion of a high pressure chamber base cloth, the end portion is positioned at a low pressure chamber side of a high pressure chamber outer base cloth, the high pressure chamber outer base cloth is positioned at a seat transverse direction outer side of a vehicle seat, the end portion of the high pressure chamber base cloth being sewn to a high pressure chamber inner base cloth that is part of the high pressure chamber base cloth, the high pressure chamber inner base cloth being positioned at a seat transverse direction inner side, the partitioning wall dividing the high pressure chamber and the low pressure chamber;
an inflator that, at a time of a side collision, jets-out gas for inflation from a gas jetting-out portion, and supplies gas to an interior of the side airbag; and
a check valve that is provided integrally with the partitioning wall, and that is formed by an extending portion toward a low pressure chamber side being provided at an end portion, the end portion is positioned at the low pressure chamber side of the high pressure chamber outer base cloth, the high pressure chamber outer base cloth being positioned at a seat rear side within the side airbag, the extending portion being folded-over toward a high pressure chamber side, and an end edge at a seat front side and an end edge at a seat rear side of the extending portion respectively being sewn to the high pressure chamber inner base cloth of the high pressure chamber base cloth that is positioned at the seat transverse direction inner side, the check valve permitting flowing of gas, jetted-out from the gas jetting-out portion of the inflator, from the low pressure chamber to the high pressure chamber, and regulating flowing of gas in an opposite direction.

6. The side airbag device for a vehicle of claim 5, wherein a diffuser that distributes gas, jetted-out from the gas jetting-out portion of the inflator, mainly to a high pressure chamber side, and that distributes the gas also to a low pressure chamber side, is provided integrally with the partitioning wall.

7. The side airbag device for a vehicle of claim 6, wherein coating for increasing air-tightness is carried out on an inner surface of the high pressure chamber base cloth.

8. The side airbag device for a vehicle of claim 5, wherein coating for increasing air-tightness is carried out on an inner surface of the high pressure chamber base cloth.

9. A side airbag device for a vehicle, comprising:
a side airbag having a high pressure chamber that becomes a high pressure side at a time of inflation and deployment, and a low pressure chamber that becomes a lower pressure than the high pressure chamber, the high pressure chamber and the low pressure chamber each inflating and deploying at a time of a side collision;
a partitioning wall that is formed by an end portion of a low pressure chamber base cloth the end portion is positioned at a high pressure chamber side of a low pressure chamber outer base cloth, a low pressure chamber outer base cloth being positioned at a seat transverse direction outer side of a vehicle seat and being sewn to a low pressure chamber inner base cloth that is part of the low pressure chamber base cloth and is positioned at a seat transverse direction inner side, the partitioning wall dividing the high pressure chamber and the low pressure chamber;
an inflator that, at a time of a side collision, jets-out gas for inflation from a gas jetting-out portion, and supplies gas to an interior of the side airbag; and
a check valve that is provided integrally with the partitioning wall, and that is formed by an extending portion toward a high pressure chamber side being provided at an end portion at the high pressure chamber side of the low pressure chamber outer base cloth, the check valve being located at a seat rear side within the side airbag, an end edge at a seat front side and an end edge at a seat rear side of the extending portion respectively being sewn to a high pressure chamber inner base cloth that is part of the high pressure chamber base cloth, the high pressure chamber base cloth is positioned at the seat transverse direction inner side, the check valve permitting flowing of gas, jetted-out from the gas jetting-out portion of the inflator, from the low pressure chamber to the high pressure chamber, and regulating flowing of gas in an opposite direction.

10. The side airbag device for a vehicle of claim 9, wherein a diffuser that distributes gas, jetted-out from the gas jetting-out portion of the inflator, mainly to a high pressure chamber side, and that distributes the gas also to a low pressure chamber side, is provided integrally with the partitioning wall.

11. The side airbag device for a vehicle of claim 10, wherein coating for increasing air-tightness is carried out on an inner surface of the high pressure chamber base cloth.

12. The side airbag device for a vehicle of claim 9, wherein coating for increasing air-tightness is carried out on an inner surface of the high pressure chamber base cloth.

\* \* \* \* \*